US00RE37401B1

(19) United States
(12) Reissued Patent
Yamashita et al.

(10) Patent Number: US RE37,401 E
(45) Date of Reissued Patent: Oct. 2, 2001

(54) FAULT RECOVERY SYSTEM OF A RING NETWORK

(75) Inventors: Haruo Yamashita; Yuji Takizawa, both of Kawasaki; Kazuo Yamaguchi, Hiratsuka, all of (JP)

(73) Assignee: Fujitsu Limited, Kawasaki (JP)

(21) Appl. No.: 08/637,843

(22) Filed: Apr. 25, 1996

Related U.S. Patent Documents

Reissue of:
(64) Patent No.: 5,307,353
Issued: Apr. 26, 1994
Appl. No.: 07/696,742
Filed: May 7, 1991

(30) Foreign Application Priority Data

May 9, 1990 (JP) ..... 2-119524

(51) Int. Cl.[7] ..... H02H 3/05; H03K 19/003
(52) U.S. Cl. ..... 714/717; 714/716; 714/4
(58) Field of Search ..... 714/717, 716, 714/712, 2, 4; 370/224, 907

(56) References Cited

U.S. PATENT DOCUMENTS

| | | |
|---|---|---|
| 3,519,935 | 7/1970 | Hochgraf . |
| 3,652,798 | 3/1972 | McNeilly et al. . |
| 3,859,468 | 1/1975 | Smith et al. . |
| 3,876,983 | 4/1975 | Zafiropulo al. . |
| 4,190,821 | 2/1980 | Woodward . |
| 4,320,508 | 3/1982 | Takazoe . |
| 4,352,180 | 9/1982 | Schulze . |
| 4,370,744 | 1/1983 | Hirano et al. . |
| 4,506,357 | 3/1985 | Nayayashiki et al. . |
| 4,519,070 | 5/1985 | Bell . |
| 4,527,270 | 7/1985 | Sweeton . |
| 4,542,496 | 9/1985 | Takeyama et al. . |
| 4,542,502 | 9/1985 | Levinson et al. . |
| 4,575,843 | 3/1986 | David et al. . |
| 4,587,651 | 5/1986 | Nelson et al. . |
| 4,602,365 | 7/1986 | White et al. . |
| 4,633,246 | 12/1986 | Jones et al. . |
| 4,648,088 | 3/1987 | Cagle et al. . |
| 4,704,741 | 11/1987 | Tomizawa et al. . |
| 4,747,097 | 5/1988 | Ohya et al. . |
| 4,769,807 | 9/1988 | Niwa et al. . |
| 4,769,839 | 9/1988 | Preineder et al. . |
| 4,815,069 | 3/1989 | Nakayashiki et al. . |
| 4,835,763 | 5/1989 | Lau et al. . |
| 4,837,856 | 6/1989 | Glista, Jr. . |
| 4,899,142 | 2/1990 | Nakayashiki et al. . |
| 4,930,119 | 5/1990 | Kobayashi et al. . |
| 4,937,823 | 6/1990 | Bekki et al. . |

(List continued on next page.)

FOREIGN PATENT DOCUMENTS

| | | |
|---|---|---|
| 79426 | 5/1983 | (EP) . |
| 91129 | 10/1983 | (EP) . |
| 0102222 | 3/1984 | (EP) . |
| 0115658 | 8/1984 | (EP) . |

(List continued on next page.)

OTHER PUBLICATIONS

Fukui et al., "Optical Subscriber Network Architecture for Broadband ISDN", Intl. Conf. on Comm. '88, Jun. 12–15, 1988, p. 883–889.

(List continued on next page.)

*Primary Examiner*—Dieu-Minh T. Le
(74) *Attorney, Agent, or Firm*—Staas & Halsey

(57) ABSTRACT

A fault recovery system of a ring network based on a synchronous transport module transmission system, having a fault data writing unit for writing, when an input fault is detected by a node, fault data in a predetermined user byte in an overhead of a frame flowing through both a working line and a protection line running in opposite directions to each other. By detecting the fault data in a supervision node or a node just before the fault position, the supervision node or the node just before the fault position executes a loopback operation.

46 Claims, 14 Drawing Sheets

U.S. PATENT DOCUMENTS

| | | |
|---|---|---|
| 4,965,790 | 10/1990 | Nishino et al. . |
| 4,973,953 | 11/1990 | Shimokawa et al. . |
| 5,093,824 | 3/1992 | Coan et al. . |
| 5,105,188 | 4/1992 | Jung et al. . |
| 5,136,589 | 8/1992 | Konishi . |
| 5,150,356 | 9/1992 | Tsutsui . |
| 5,159,595 | 10/1992 | Flanagan . |
| 5,191,579 | 3/1993 | Matsushita et al. . |
| 5,265,096 | 11/1993 | Parruck . |
| 5,278,824 | 1/1994 | Kremer . |
| 5,282,200 | 1/1994 | Dempsey et al. . |
| 5,390,164 | 2/1995 | Kremer . |
| 5,394,389 | 2/1995 | Kremer . |
| 5,406,401 | 4/1995 | Kremer . |
| 5,406,549 | 4/1995 | Kremer . |
| 5,440,540 | 8/1995 | Kremer . |
| 5,442,620 | 8/1995 | Kremer . |

FOREIGN PATENT DOCUMENTS

| | | |
|---|---|---|
| 144953 | 6/1985 | (EP) . |
| 212701 | 3/1987 | (EP) . |
| 2114858 | 8/1983 | (GB) . |
| 2115649 | 9/1983 | (GB) . |
| 2260876 | 4/1993 | (GB) . |
| 53-68046 | 6/1978 | (JP) . |
| 56-75747 | 6/1981 | (JP) . |
| 56-112156 | 9/1981 | (JP) . |
| 56-112157 | 9/1981 | (JP) . |
| 56-112158 | 9/1981 | (JP) . |
| 56-119556 | 9/1981 | (JP) . |
| 56-149851 | 11/1981 | (JP) . |
| 57-173245 | 10/1982 | (JP) . |
| 57-173246 | 10/1982 | (JP) . |
| 58-117746 | 7/1983 | (JP) . |
| 59-57544 | 4/1984 | (JP) . |
| 58-80042 | 5/1984 | (JP) . |
| 58-80043 | 5/1984 | (JP) . |
| 59-91757 | 5/1984 | (JP) . |
| 59-158649 | 9/1984 | (JP) . |
| 60-46636 | 3/1985 | (JP) . |
| 60-136444 | 7/1985 | (JP) . |
| 60-197044 | 10/1985 | (JP) . |
| 60-197045 | 10/1985 | (JP) . |
| 60-236543 | 11/1985 | (JP) . |
| 61-1145 | 1/1986 | (JP) . |
| 61-2447 | 1/1986 | (JP) . |
| 61-58351 | 3/1986 | (JP) . |
| 61-58352 | 3/1986 | (JP) . |
| 61-292438 | 12/1986 | (JP) . |
| 61-292439 | 12/1986 | (JP) . |
| 62-94036 | 4/1987 | (JP) . |
| 62-98839 | 5/1987 | (JP) . |
| 62-214748 | 9/1987 | (JP) . |
| 63-43445 | 2/1988 | (JP) . |
| 63-46029 | 2/1988 | (JP) . |
| 63-161748 | 7/1988 | (JP) . |
| 63-263944 | 10/1988 | (JP) . |
| 63-316541 | 12/1988 | (JP) . |
| 1-12637 | 1/1989 | (JP) . |
| 1-105636 | 4/1989 | (JP) . |
| 1-105637 | 4/1989 | (JP) . |
| 1-112848 | 5/1989 | (JP) . |
| 1-112849 | 5/1989 | (JP) . |
| 1-143539 | 6/1989 | (JP) . |
| 1-221953 | 9/1989 | (JP) . |
| 1-221954 | 9/1989 | (JP) . |
| 1-221955 | 9/1989 | (JP) . |
| 1-196738 | 11/1989 | (JP) . |
| 2-10946 | 1/1990 | (JP) . |
| 2-10948 | 1/1990 | (JP) . |
| 2-10949 | 1/1990 | (JP) . |
| 2-81537 | 3/1990 | (JP) . |
| 85/93183 | 7/1985 | (WO) . |

OTHER PUBLICATIONS

Hajikano et al., "Asynchronous Transfer Mode Switching Architecture for Broadband ISDN", Intl. Conf. on Comm. '88, Jun. 12–15, 1988, pp. 911–915.

Nishisno et al., "Broadband Switching System Configuration and Access Protocol", Intl. Conf. on Comm. '88, Jun. 12–15, 1988, pp. 928–933.

Haney, R. D., "Rethinking Networks: A Coordinated Approach", *Mini–Micro Systems*, Jul. 1985, pp. 145–153.

Newman et al., "The QPSX MAN", *IEEE Communications Magazine*, vol. 26, No. 4, Apr. 1988, pp. 20–28.

Rocher, E. Y., "Information Outlet, ULAN Versus ISDN", *IEEE Communications Magazine*, Apr. 1987, vol. 25, No. 4, pp. 18–32.

Rokugo et al., "An Asynchronouse DS3 Cross–Connect System with Add/Drop Capability", GLOBECOM '88, Nov. 28–Dec. 1, 1988, pp. 1555–1559.

Fujimoto et al., "Broadband Subscriber Loop Network: Optical Shuttle Bus", *IEICE Technical Report*, Oct. 28, 1987, pp. 51–58.

Taniguchi et al., "Experimental Broadband Subscriber Loop Network 'Otpical Shuttle Bus'", [English Abstract], *IEICE Technical Report*, Jul. 22, 1988, pp. 1–6.

Nakai et al., "A study on Highly Reliable Control in Loop Network Systems", [English Abstract], *IEICE Technical Report*, Apr. 23, 1986, pp. 31–36.

Ohnishi et al., "ATM Ring Protocol and Performance", Intl. Conf. on Comm. '89, Jun. 11–14, 1989, pp. 394–398.

Bellcore GR–1230–CORE (Issue 1), SONET Bi–directional Line–Switched Ring Equipment Generic Criteria, Dec. 1993.

Bellcore TR–NWT–000253 (Issue 2), Synchronous Optical Network (SONET) Transport Systems: Common Generic Criteria, Dec. 1991.

CCITT Recommendations G.707 (Blue Book), Synchronous Digital Hierarchy Bit Rates, Nov. 1988.

CCITT Recommendations G.708 (Blue Book), Network Node Interface for the Synchronous Digital Hierarchy, Nov. 1988.

CCITT Recommendations G.709 (Blue Book), Synchronous Multiplexing Structure, Nov. 1988.

Kremer, A Bi–directional Ring APS Algorithm Which Deterministically Prevents Misconnections, Contribution to T1 Standards Project (T1X1.5/91–126), Jul. 15, 1991.

Minami et al., High–Speed Optical Loop Network for Flexible Multi–Service Integration, FUJITSU Sci. Tech.J., vol. 22, No. 22, No. 2, Jun. 1986, pp. 106–114.

Kingsley, Choices in Sonet Ring Architecture, Business Communications Review, Jun. 1994, pp. 61–65.

Wu et al., Feasibility Study of a High–Speed SONET Self–Healing Ring Architecture in Future Interoffice Networks, IEEE Communications Magazine, Nov. 1990, pp. 33–51.

Ritchie et al., SYNTRAN—A new direction for digital transmission terminals, IEEE Communications Magazine, vol. 23, No. 11, Nov. 1985, pp. 20–25.

Prisco et al., Fiber Optic Regional Area Network, IEEE Communications Magazine, vol. 23, No. 11, Nov. 1985, pp. 26–39.

McDonald, Recovery From Telecommunications Deregulation, IEEE Communications Magazine, vol. 23, No. 11, Nov. 1985, pp. 40–41.

Ballart et al., SONET: Now it's the standard optical network, IEEE Communications Magazine, Mar. 1989, pp. 8–15.

Sosnosky et al., SONET Ring Applications for Survivable Fiber Loop Networks, IEEE Communications Magazine, Jun. 1991, pp. 51–58.

Boehm et al., Standardized Fiber Optic Transmission Systems—A Synchronous Optical Network View, IEEE Journal on Selected Areas in Communications, vol. SAC–4, No. 9, Dec. 1986, pp. 1424–1431.

Reedy, The TDM Ring—A Fiber Optic Transport System for Campus or Metropolitan Networks, IEEE Journal on Selected Areas in Communications, vol. SAC–4, No. 9, Dec. 1986, pp. 1474–1483.

Kerner et al., An Analysis of Alternative Architecture for the Interoffice Network, IEEE Journal on Selected Areas in Communications, vol. SAC–9, No. 9, Dec. 1986, pp. 1404–1413.

Cardwell et al., Computer–Aided Design Procedures for Survivable Fiber Optic Telephone Networks., IEEE Journal on Selected Areas in Communications, vol. 7, No. 8, Oct. 1989, pp. 1188–1197.

Wu et al., Survivable Network Architectures for Broadband Fiber Optic Networks: Model and Performance Comparisons, IEEE Journal of Lightwave Technologies, vol. 6, No. 11, Nov. 1988, pp. 1698–1709.

Tsai et al., A comparison of Strategies for Survivable Network Design: Reconfigurable and Conventional Approaches, GLOBCOM '90 Conference Record, Dec. 2–5, 1990, pp. 301.1–301.1.7.

Ellefson, Migration of Fault Tolerant Networks, GLOBCOM '90 Conference Record, Dec. 2–5, 1990, pp. 301.4.1–301.4.7.

Ishii et al., Virtual Sub–container Multiplexing Method for Optical Subscriber System, GLOBCOM '90 Conference Record, Dec. 2–5, 1990, pp. 303.1.1–303.1.5.

Iwashita et al., Evaluation of Fiber Network Configurations in Access Networks, GLOBCOM '90 Conference Record, Dec. 2–5, 1990, pp. 303.5.1–303.5.5.

Smith, Sonet Self–healing Networks, GLOBCOM '90 Conference Record, Dec. 2–5, 1990, pp. 304.6.1–304.6.5.

Wu et al., A Class of Self–Healing Ring Architectures for SONET Nework Applications, GLOBCOM '90 Conference Record, Dec. 2–5, 1990, pp. 403.2.1–403.2.8.

Yan et al., Bandwidth Management in a Sonet Transport Network, GLOBCOM '90 Conference Record, Dec. 2–5, 1990, pp. 705B.2.1–705B.2.7.

Uenoya et al., Operation, Administration and Maintenance Systems of the Optical Fiber Loop, GLOBCOM '90 Conference Record, Dec. 2–5, 1990, pp. 802.5.1–802.5.5.

Catania et al., Performance–Reliability Improvement in a Distributed System, GLOBCOM '89 Conference Record, Nov. 27–30, 1989, pp. 9.4.1–9.4.8.

Wu et al., High–Speed Self–Healing Architectures for Future Interoffice Networks, GLOBCOM '89 Conference Record, Nov. 27–30, 1989, pp. 23.1.1–23.1.7.

Conlisk, Topology and Survivability of Future Transport Networks, GLOBCOM '89 Conference Record, Nov. 27–30, 1989, pp. 23.5.1–23.5.9.

Karol et al., High–Performance Optical Local and Metropolitan Area Networks: Enhancements of FDDI and IEEE 802.6 DQDB, GLOBCOM '89 Conference Record, Nov. 27–30, 1989, pp. 28.3.1–28.3.8.

Asatani, Network Node Interface for New Synchronous Digital Networks: Concepts and Standardization, GLOBCOM '88 Conference Record, Nov. 28–Dec. 1, 1988, pp. 4.5.1–4.5.7.

Nosu et al., Performance Consideration on High Capacity Optical FDM Networks, GLOBCOM '88 Conference Record, Nov. 28–Dec. 1, 1988, pp. 15.6.1–15.6.5.

Ohno et al., Optical High Speed (100Mbps) Token Ring System GLOBCOM '88 Conference Record, Nov. 28–Dec. 1, 1988, pp. 20.4.1–20.4.8.

DeWilde et al., Integrated Switch and Cross–Connect Systems as a Flexible Transport Network, GLOBCOM '88 Conference Record, Nov. 28–Dec. 1, 1988, pp. 21.5.1–21.5.4.

Fujimoto et al., Experimental Broadband Drop/Insert Cross–Connect System: 1.8 Gbit/s Optical Shuttle Bus, GLOBCOM '88 Conference Record, Nov. 28–Dec. 1, 1988, pp. 29.6.1–29.6.6.

Flanagan et al., Application Benefits of SONET Networking, GLOBCOM '88 Coference Record, Nov. 28–Dec. 1, 1988, pp. 30.3.1–30.3.5.

Boehm, The SONET Interface and Network Applications, GLOBCOM '88 Conference Record, Nov. 28–Dec. 1, 1988, pp. 30.4.1–30.4.5.

Sandesara et al., SONET Intra–Office Interconnect Signal. GLOBCOM '88 Conference Record, Nov. 28–Dec. 1, 1988, pp. 30.5.1–30.5.7.

Ohta et al., A Dynamically Controllable ATM Transport Network Based on the Virtual Path Concept, GLOBCOM '88 Conference Record, Nov. 28–Dec. 1, 1988, pp. 39.2.1–39.2.5.

Sandesara et al., Synchronous Optical Network Format and Terminal Applications, GLOBCOM '87 Conference Record, Nov. 15–18, 1987, pp. 13.1.1–13.1.5.

Aragaki et al., A Fiber–Optic Point–to–Multipoint Interface Configuration for ISDN Broadband Access, GLOBCOM '87 Conference Record, Nov. 15–18, 1987, pp. 13.3.1–13.3.5.

Hughes, SONET in California: Pacific Bell's Plans for the Physical Layer Wideband Access, GLOBCOM '87 Conference Record, Nov. 15–18, 1987, pp. 13.4.1–13.4.3.

Grover, The SELFHEALING Network: A Fast Distributed Restoration Technique for Networking using Digital Crossconnect Machines, GLOBCOM '87 Conference Record, Nov. 15–18, 1987, pp. 28.2.1–28.2.6.

Nakano et al., VLSI for Digital Cross–Connect Switch in Broad–Band Access Network, GLOBCOM 'Conference Record, Nov. 15–18, 1987, pp. 28.6.1–28.6.5.

Fujimoto et al., Broadband Subscriber Loop System using Multi–Gigabit Intelligent Optical Shuttle Nodes, GLOBCOM '87 Conference Record, Nov. 15–18, 1987, pp. 37.3.1–37.3.6.

Shimizu et al., A High–Speed Optical Transport Network with Flexible Access Capabilities, GLOBCOM '87 Conference Record, Nov. 15–18, 1987, pp. 37.6.1–37.6.5.

Wakabayashi et al., A Synchronous DS3 Add/Drop Multiplexer with Cross–Connect, GLOBCOM '86 Conference Record, Dec. 1–4, 1986, pp. 33.5.1–33.5.5.

Yukawa et al., Fiber Optics System Applications for Private Communication Networks, GLOBCOM '86 Conference Record, Dec. 1–4, 1986, pp. 34.3.1–34.3.6.

Harvey et al., Network Planning for the SYNTRAN Add/Drop Multiplex (ADM), GLOBCOM '86 Conference Record, Dec. 1–4, 1986, pp. 45.3.1–45.3.5.
Lewis et al., A Model of Slip Impairment in Synchronous Digital Transmission, GLOBCOM '86 Conference Record, Dec. 1–4, 1986, pp. 45.6.1–45.6.5.
Minami et al., 200 MB/S Synchronous TDM Loop Optical LAN suitable for Multi–Service Integration, GLOBCOM '85 Conference Record, Dec. 2–5, 1985, pp. 1.4.1–1.4.6.
Iguchi et al., Multi–Channel, Multi–Drop Digital Video Transmission Equipments for Optical CATV, GLOBCOM '85 Conference Record, Dec. 2–5, 1985, pp. 1.5.1–1.5.5.
Patir et al., An Optical Fiber based Integrated LAN or MAGNET's Testbed Environment, GLOBCOM '85 Conference Record, Dec. 2–5, 1985, pp. 1.6.1–1.6.5.
Brandsma, PHILAN: A Fiber–Optic Ring for Integrated Traffic, GLOBCOM '85 Conference Record, Dec. 2–5, 1985, pp. 15.5.1–15.5.4.
Ohno et al., Multipurpose Optical Loop Network, GLOBCOM '85 Conference Record, Dec. 2–5, 1985, 34.6.1–34.6.6.
Boehm et al., SONET (Synchronous Optical Network), GLOBCOM '85 Conference Record, Dec. 2–5, 1985, pp. 46.8.1–46.8.8.
Lecoy et al., Design and Realization of Optical Fiber Data Buses, GLOBCOM '84 Conference Record, Nov. 26–29, 1984, pp. 2.2.1–2.2.5.
Ballart et al., Restructured DS3 Format for Synchronous Transmission (SYNTRAN), GLOBCOM '84 Conference Record, Nov. 26–29, 1984, pp. 31.2.1–31.2.7.
Jones et al., TDM Ring: A DS1 Transport System for Local Networks, GLOBCOM '84 Conference Record, Nov. 26–29, 1984, pp. 42.2.1–42.2.8.
Maruta et al., SONET based Network Architecture and its applications, ICC '90 Conference Record, Apr. 16–19, 1990, pp. 321.1.1–321.1.5.
Flanagan, Planning a SONET Network, ICC '90 Conference Record, Apr. 16–19, 1990, pp. 321.2.1–321.2.6.
McConnell, Utilizing Fiber Optic Rings for Network Survivability and Restoration, ICC '90 Conference Record, Apr. 16–19, 1990, pp. 321.3–321.3.4.
Lau, An Architecture for a SONET Self–Healing Ring, Contribution to T1 Standards Project (T1X1.5/89–088), May 10, 1989.
Nishida et al., Phase 2 SONET APS: Dual Control for APS Scheme, Contribution to T1 Standards Project (T1X1.5/89–054), Apr. 24, 1989.
Hasegawa et al., Protection Switching in a SONET Ring Architecture, Contribution to T1 Standards Project (T1X1.5/89–053), Apr. 12, 1989.
CCITT Study Group XV Working Party 5 Geneva, Question: 29/XV (Characteristics of digital systems on optical fiber cables for the synchronous hierarchy), Nov. 20 to Dec. 1, 1989.
Hasegawa et al., APS in a Sonet Ring Architecture, Contribution to T1 Standards Project (T1X1.5/89–114), Jul. 20, 1989.
Boehm et al., Reliability of a Self–healing SONET Ring Architecture, Contribution to T1 Standards Project (TX1.5/90–065), Apr. 20, 1990.
Boehm et al., Overhead Usage for Protection Switching in a Self–healing SONET Ring, Contribution to T1 Standards Project (T1X1.5/90–066), Apr. 20, 1990.
Constable, G.R., "Fiberoptic LANs: The System Integrator's Perspective", Laser Focus, vol. 23, No. 3, Mar. 1987, pp. 112–120.
Yuji Takizawa et al., "Self–Healing Broadband SDH–Ring " 1990 Spring National Convention Record, The Institute of Electronics, Information and Communication Engineers, Mar. 18–21, 1990, p. 3–130 (in Japanese with English Translation).
H. Yamashita et al., "Flexible Synchronous Broad–Band Subscriber Loop System: Optical Shuttle Bus", , Journal of Lightwave Technology, vol. 7 No. 11, Nov. 1989, pp. 1788–1797.
Japanese Search Report for Application JP–2–119524, mailed Jul. 29, 1997.
European Search Report, The Hague, Dec. 19, 1991.

Fig. 1

| | 1 | 2 | 3 | 4 | 5 | 6 | 7 | 8 | 9 |
|---|---|---|---|---|---|---|---|---|---|
| 1 | A1 | A1 | A1 | A2 | A2 | A2 | C1 | | |
| 2 | B1 | | | E1 | | | F1 | | |
| 3 | D1 | | | D2 | | | D3 | | |
| 4 | ADDRESS POINTER (AU) | | | | | | | | |
| 5 | B2 | B2 | B2 | K1 | | | K2 | | |
| 6 | D4 | | | D5 | | | D6 | | |
| 7 | D7 | | | D8 | | | D9 | | |
| 8 | D10 | | | D11 | | | D12 | | |
| 9 | Z1 | Z1 | Z1 | Z2 | Z2 | Z2 | E2 | | |

DEFINITION OF THE F1 BYTE

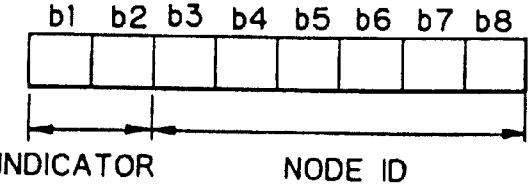

Fig. 6A b1 : "0" MEANS FAILURE-DETECTED NODE IDENTIFIER (NODE ID) ON WORKING LINE.
"1" MEANS FAILURE-DETECTED NODE IDENTIFIER (NODE ID) ON PROTECTION LINE.

b2 : "0" MEANS FAILURE REPORTING
"1" MEANS THE SWITCH REQUEST AT THE NODE DESIGNATED WITH NODE ID

Fig. 6B

FRAME STRUCTURE OF THE F1 BYTE

SUCCESSIVE TWO OF THE F1 BYTES CONSTITUTES A FRAME.

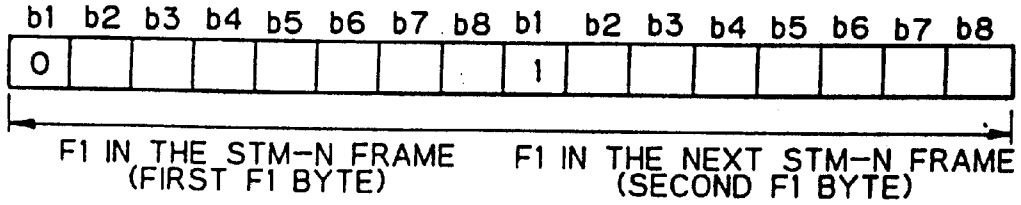

Fig. 6C

| STATE OF THE ABOVE FIGURE | FRAME OF THE F1 BYTES | |
|---|---|---|
| | 1st F1 | 2nd F1 |
| (1) THE NOMAL STATE | 00000000 | 10000000 |
| (2) | 00000000 | 10000011 |
| (3) | 00000001 | 10000000 |

Fig. 14

| RING FAILURE STATE (1) | | | RING FAILURE STATE (2) | | | RING FAILURE STATE (3) | | |
|---|---|---|---|---|---|---|---|---|
| 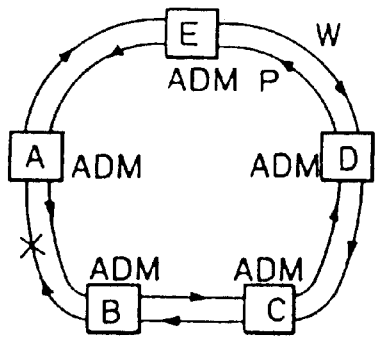 | | | 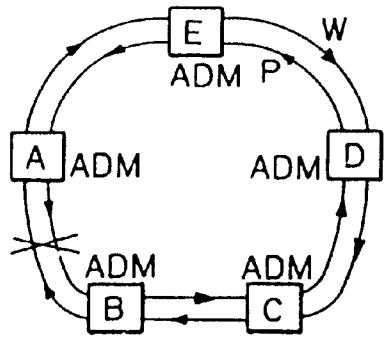 | | | 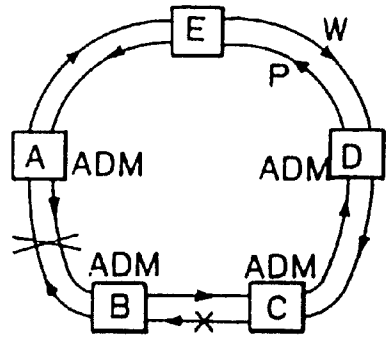 | | |
| STATE OF THE F1 BYTE | | | STATE OF THE F1 BYTE | | | STATE OF THE F1 BYTE | | |
| TIME | W | P | TIME | W | P | TIME | W | P |
| t1 | F1(A,-,0) | F1(A,-,0) | t1 | F1(A,-,0) | F1(-,B,0) | t1 | F1(A,-,0) | F1(B,B,0) |
| t2 | F1(A,-,0) | F1(A,-,0) | t2 | F1(A,B,0) | F1(A,B,0) | t2 | F1(A,B,0) | F1(B,B,0) |
| FAILURE INDENTIFICATION | | | FAILURE INDENTIFICATION | | | FAILURE INDENTIFICATION | | |
| ·FIBER CUT BETWEEN A AND B ON W. | | | ·FIBER CUT BETWEEN A AND B ON BOTH W AND P. | | | ·FIBER CUT BETWEEN A AND B ON BOTH W AND P.<br>·FIBER CUT BETWEEN B AND C ON W. | | |

* W : WORKING LINE. P : PROTECTION LINE
* TIME t1 : FAILURE OCCURRENCE TIME
* TIME t2 : A CERTAIN TIME LATER AFTER FAILURES OCCURRED.

FAULT RECOVERY SYSTEM OF A RING NETWORK

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a fault recovery system of a ring network, and more particularly to a fault recovery system of a ring network based on a synchronous transport module (STM) transmission system called a new synchronization system.

Ring networks based on the synchronous transport module (STM) transmission system such as a synchronous digital hierarchy (SDH) or synchronous optical network (SONET) the standardization of which has been developed in the CCITT or United States T1 Committee, are expected to be applied to subscriber systems (Urban Networks) in the future. The STM transmission system is applied to a high speed and broad band system of more than 155.52 Mbps. When a ring network, based on such a STM transmission system which is a high speed and broad band optical transmission system, is constructed, the ability to survive a fault in the network is important and should be considered from the beginning of the construction of the system, since a network fault can have a great influence on the transfer of information in a modern information society.

2. Description of the Related Art

As a conventionally proposed network fault recovery system, there are recovery systems employing a loopback used in a local area network (LAN) and so forth. These conventional recovery systems, however, are networks based on packet communication through predetermined protocols, and therefore, there are problems in that it takes a long processing time of several seconds to recover from a fault because the fault must be recovered by the use of the above-mentioned predetermined protocols. Since the recovery time in a new synchronization system should be shorter than, for example, 50 msec, a recovery method which uses these protocols cannot be employed in a new synchronization system.

On the other hand, for point to point communication, the standard usage of automatic protection scheme (APS) bytes (K1 and K2 bytes in an STM frame) for a switching control between a working line and a protection line has been recommended by the CCITT or the United States T1 Committee. For application to a ring network, however, standard usage has not been proposed.

A fault recovery system applied to a ring network is disclosed in Japanese Patent Publication 1-45782, published on Oct. 4, 1989. This fault recovery system, however, is not applied to the STM transmission system. Further, in this document, if multiple faults occur in the working line and the protection line, the positions of the faults cannot be determined.

SUMMARY OF THE INVENTION

Accordingly, the present invention has an object to provide, based on the synchronous transport module (STM) transmission system, a system for rapidly and efficiently recovering a ring network even when multiple faults occurs.

There is provided, according to the present invention, a centralized control type ring network based on a synchronous transport module transmission system, with a fault recovery system for recovering a fault in the ring network. The ring network provides optical fiber transmission lines including a working line and a protection line running in opposite directions to each other, a plurality of drop/insert nodes connected [to,] *to* each other through the optical fiber transmission lines and a supervision node, connected through the optical fiber transmission lines to the drop/insert nodes.

Each of the drop/insert nodes [has:] *has* an input fault detecting unit for detecting an input fault on the working line or the protection line. A fault data writing unit is also provided within each drop/insert node for writing, when the input fault is detected by the input fault detecting unit, fault data into a predetermined user byte within an overhead of a frame flowing through both the working line and the protection line. A user byte passing unit is also provided with each drop/insert node for passing the user byte as is, when an input fault is not detected by the input fault detecting unit, through the node.

The supervision node has a fault data detecting unit for detecting the fault data in the user byte transmitted from the node which has detected the input fault through the downstream sides of the working line and the protection line of the node which has detected the input fault. A fault position determining unit is also provided within the supervision node for determining, based on the fault data detected by the fault data detecting unit, a node which has detected the input fault. A writing unit is also provided within the supervision node for writing, into the user bytes, loopback requests for requesting nodes located immediately downstream and upstream of the fault position and closest to the supervision node, to execute loopback operations. Finally, a sending unit for sending the loopback requests through the working line and the protection line to the nodes located immediately downstream and upstream of the fault position and closest to the supervision node. Based on this construction, the nodes located immediately downstream and upstream of the fault position and closest to the supervision node execute loopback operations to recover from the fault.

According to another aspect of the present invention, there is provided a distributed control type ring network based on a synchronous transport module transmission system, with a fault recovery system for recovering a fault in the ring network. The distributed control type ring network provides optical fiber transmission lines including a working line and a protection line running in opposite directions to each other. A plurality of drop/insert nodes is also provided connected to each other through the optical fiber transmission lines.

Each of the drop/insert nodes has an input fault detecting unit for detecting an input fault on the working line or the protection line. Each drop/insert node also has fault data and loopback request writing unit for writing, when the input fault is detected by the input fault detecting unit, fault data and a loopback request into a predetermined user byte within an overhead of a frame flowing through both the working line and the protection line. A loopback executing unit is also provided within each drop/insert node for executing, based on the fault data detected by the fault data detecting unit, a loopback when the node is located immediately upstream of the input fault and adjacent to a node which has not detected an input fault. The node executing the loopback returns, in response to the loopback request, a loopback response by the use of the predetermined user byte to the node which has detected the input fault.

Based on this construction, as in the construction described in the previous aspect of the invention, the nodes located immediately upstream of the fault position and adjacent to a node which has not detected an input fault execute loopback operations to recover from the fault.

Although the invention described herein can be provided in many different forms of varying detail, without departing from the basic concept and spirit of the invention, preferred details of the above aspects of the prevent invention are described below.

It is preferable that the synchronous transport module transmission system is a system according to the recommendation of CCITT G.707, 708, and 709.

It is preferable that the fault data includes a node identification number for identifying the node which has detected the input fault.

It is preferable that the fault data includes fault line information indicating whether the input fault has occurred on the working line or on the protection line.

It is preferable that the fault data includes fault reporting information.

It is preferable that the loopback requests are formed by rewriting the fault data to include a node identification number of a node at which the loopback should be executed, and to include loopback request information.

It is preferable that the loopback requests are formed by using another byte within the overhead of the frame, other than the predetermined user byte in the overhead of the frame.

It is preferable that the other byte in the overhead of the frame is the K1 byte or the K2 byte according to the recommendation of CCITT G.707, 708, and 709.

It is preferable that the writing unit has a rewriting unit for rewriting the fault data transmitted through the working line into a first loopback request and for rewriting the fault data transmitted through the protection line into a second loopback request, and that the sending unit has a unit for sending the first loopback request through the protection line and for sending the second loopback request to the working line.

It is preferable that the ring network is a bidirectional ring network comprising a pair of clockwise and counterclockwise working lines and a pair of counterclockwise and clockwise protection lines.

It is preferable that the system comprises a plurality of pairs of the working lines and a single pair of the protection lines.

According to still another aspect of the present invention, there is provided a hybrid type ring network based on a synchronous transport module transmission system, with a fault recovery system for recovering a fault in the ring network. The hybrid type ring network provides optical fiber transmission lines including a working line and a protection line running in opposite directions to each other, and a plurality of drop/insert nodes connected to each other through the optical fiber transmission lines.

Each of the drop/insert nodes has a selecting unit for dropping the input signal from the protection line when the input signal from the working line is faulty, for dropping the input signal from the working line when the input signal from the protection line is faulty, and for dropping the input signal from the working line when both are normal, and passing the signal as is when the signal is not to be dropped.

BRIEF DESCRIPTION OF THE DRAWINGS

The above object and features of the present invention will be more apparent from the following description of the preferred embodiments with reference to the accompanying drawings, wherein:

FIG. 1 is a format diagram of an overhead of the STM frame used in a fault recovery system of a ring network according to the present invention;

FIGS. 6A to 6C are diagrams for explaining an F1 byte in the overhead used in the present invention;

FIG. 14 is a diagram showing evaluations of various fault states in the hybrid ring used in the system of the present invention.

DESCRIPTION OF THE PREFERRED EMBODIMENTS

Currently, preparation is underway of international standardization of the method of using the overhead bytes in the STM frame format of the synchronous transport module (STM) transmission system. In view of this, the inventors of the present invention have considered using the overhead bytes for recovering faults in a ring network.

Namely, FIG. 1 shows a frame format of the above-mentioned STM (in particular the frame format of the STM-1), in which bytes labelled A1, A2, B1, B2, C1, D1–D12, E1, E2, K1, and K2 respectively represent bytes, usage of which is already internationally standardized. The other labelled bytes, namely the F1 byte and Z1 and Z2 bytes have not yet been internationally standardized but are determined to be used for domestic or national use. Note that the remaining bytes are assigned for domestic use.

Accordingly, in the present invention, by using the unused bytes such as the latter F1 byte or Z1 and Z2 bytes as user bytes (UB), these bytes can be utilized to recover a fault in a ring network of the new synchronization system (hereinafter simply referred to as a ring network) constructed by optical fiber transmission lines forming a working line (W) and a protection line (P) running in opposite directions to each other.

Figure 2A:
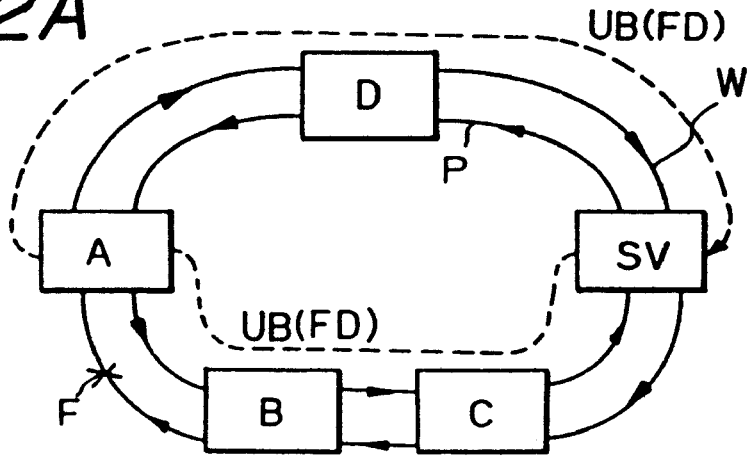
FIGS. 2A to 2C are principal construction diagrams of the fault recovery system of a centralized control type ring network according to an embodiment of the present invention.
Figure 2B:
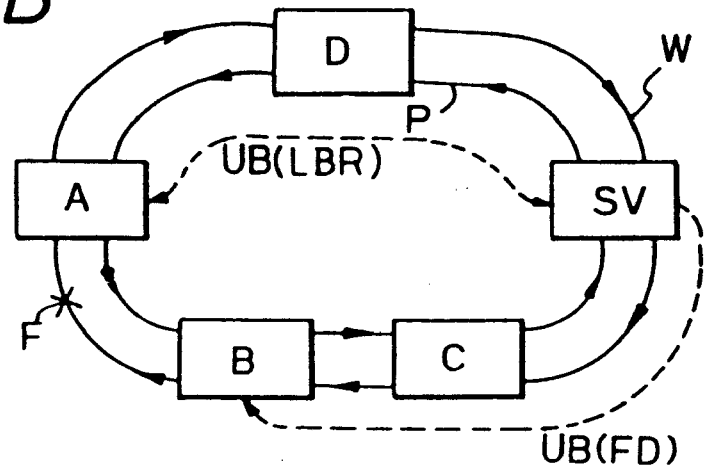
Figure 2C:
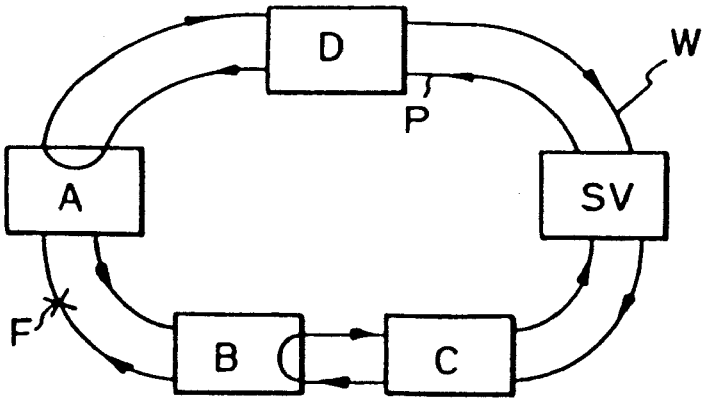

In the Case of a Centralized Control Type Ring Network (FIGS. 2A to 2C)

This ring network, as shown in FIG. 2A, is constructed by drop/insert nodes (nodes A–D for example in the figure, and hereinafter also referred to simply as nodes), and a supervision node SV. Throughout all the embodiments described in this specification, it is assumed that all of the nodes are provided in advance with node identification numbers. First, as shown in FIG. 2A, when an input fault F (marked by x) of a working line W (or a protection line P as well) is detected by a node A by detecting a clock signal error and so forth, the node A writes fault data FD in a predetermined user byte UB in the overhead of each of the STM frames flowing through the working line W and the protection line P, and transmits the STM frames including the written fault data FD to the downstream sides of the working line W and the protection line P.

When the drop/insert node does not detect an input fault, it passes the user bytes as they are to the supervision node SV, and therefore, the fault data FD in the user bytes UB are transmitted from the working line W and the protection line P.

The supervision node SV determines the position of the fault F by detecting and analyzing the fault data, as shown in FIG. 2B, and writes a loopback request LBR. The loopback request LBR requires the nodes A and B located immediately downstream and upstream of the fault position and closest to the supervision node SV, to execute loopback operations, into the user byte UB. The written loopback request LBR is transmitted through the protection line P and through the node D to the node A. The loopback request LBR is also transmitted through the working line W and through the nodes C and D to the node B.

As a result, as shown in FIG. 2C, the loopbacks are executed by these nodes A and B to recover the fault.

In this case, instead of utilizing the user byte UB for transmitting the loopback request, it may be possible to transmit the loopback request by using K1 and K2 bytes which are internationally standardized. In this case, conformity with the international standardization is achieved.

Figure 3A:
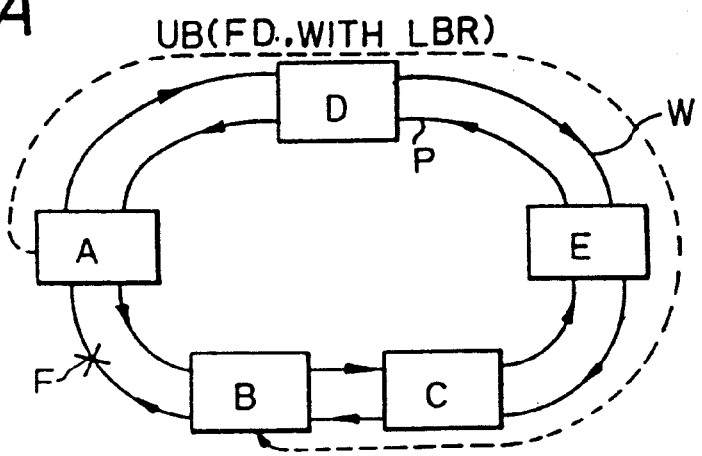
FIGS. 3A to 3C are principal construction diagrams of the fault recovery system of a distributed control type ring network according to another embodiment of the present invention.
Figure 3B:
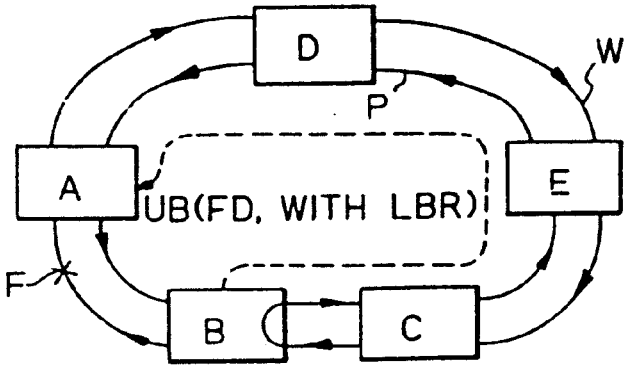
Figure 3C:
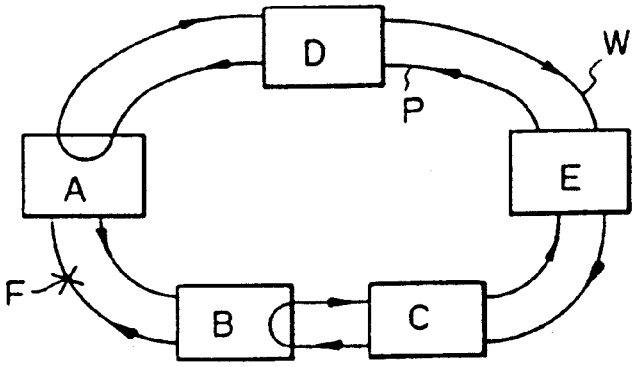

In the Case of a Distributed Type Ring Network (FIGS. 3A to 3C)

In this ring network, there is no supervision node, and the respective drop/insert nodes are in an equal relation to each other.

Accordingly, as shown in FIG. 3A, when the drop/insert node A detects an input fault of the working line W (or of the protection line P as well), it writes fault data FD including a loopback request LBR into the user bytes UB in the STM frames of the working line W and the protection line P. The user bytes UB including the fault data FD and the loopback request LRB are transmitted to the downstream sides of the working line W and the protection line P.

In a similar way to that shown in FIG. 2A, the nodes C and D pass the user bytes UB as they are. Among the respective nodes which receive the fault data, the node B located immediately upstream of the input fault and adjacent to the node C detects that there is a fault position at the output side of the node B. As a result, as shown in FIG. 3B, the node B executes the loopback operation and returns the loopback request LBR to the node A which transmitted the loopback requirement LBR.

When the node A receives the loopback request LBR, the node A executes the loopback operation based on the returned loopback request LBR so that, as shown in FIG. 3C, the loopback between the nodes A and B is completed and the fault is restored.

Figure 4A:
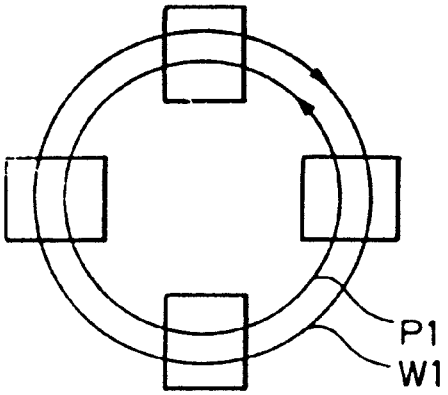
FIGS. 4A to 4D are diagrams showing examples of various ring constructions used in the present invention.
Figure 4B:
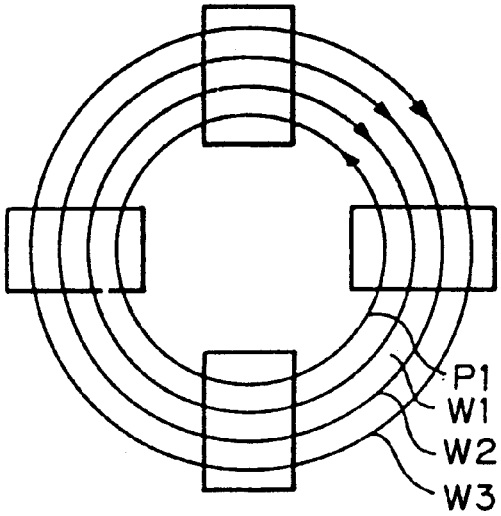
Figure 4C:
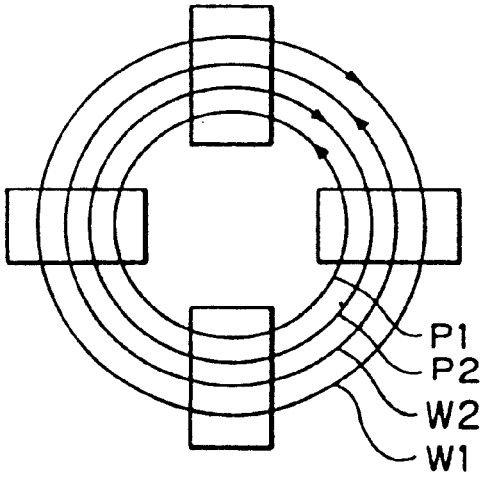
Figure 4D:
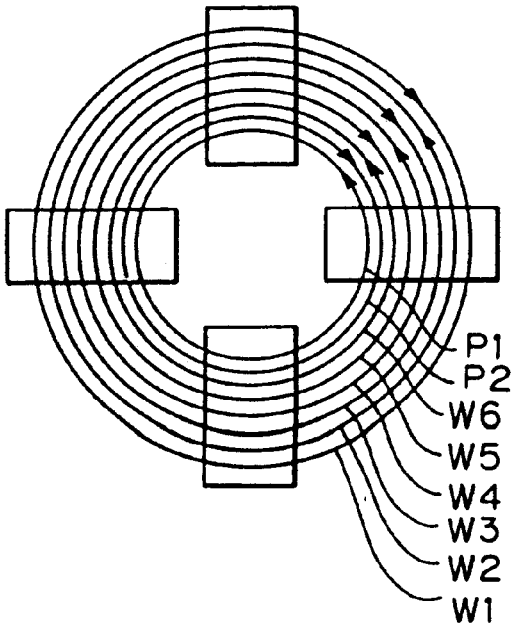

Note, in either of the centralized control type or distributed control type, not only the case is possible where the ring network is constructed by a working line W and a protection line P corresponding to each other in a 1:1 relation as shown in FIG. 4A, but a unidirectional ring constructed by a plurality of working lines and a single protection line (W1–W3 and P1 in FIG. 4B) is also possible. A bidirectional ring is also possible which is constructed by a pair of clockwise and counterclockwise working lines W1 and W2 and a pair of counterclockwise and clockwise protection lines P1 and P2 as shown in FIG. 4C. Further, the fault can also be restored by constructing a bidirectional ring having a plurality of pairs of working lines W1 to W6 and a single pair of protection lines P1 and P2 as shown in FIG. 4D.

Figure 5:
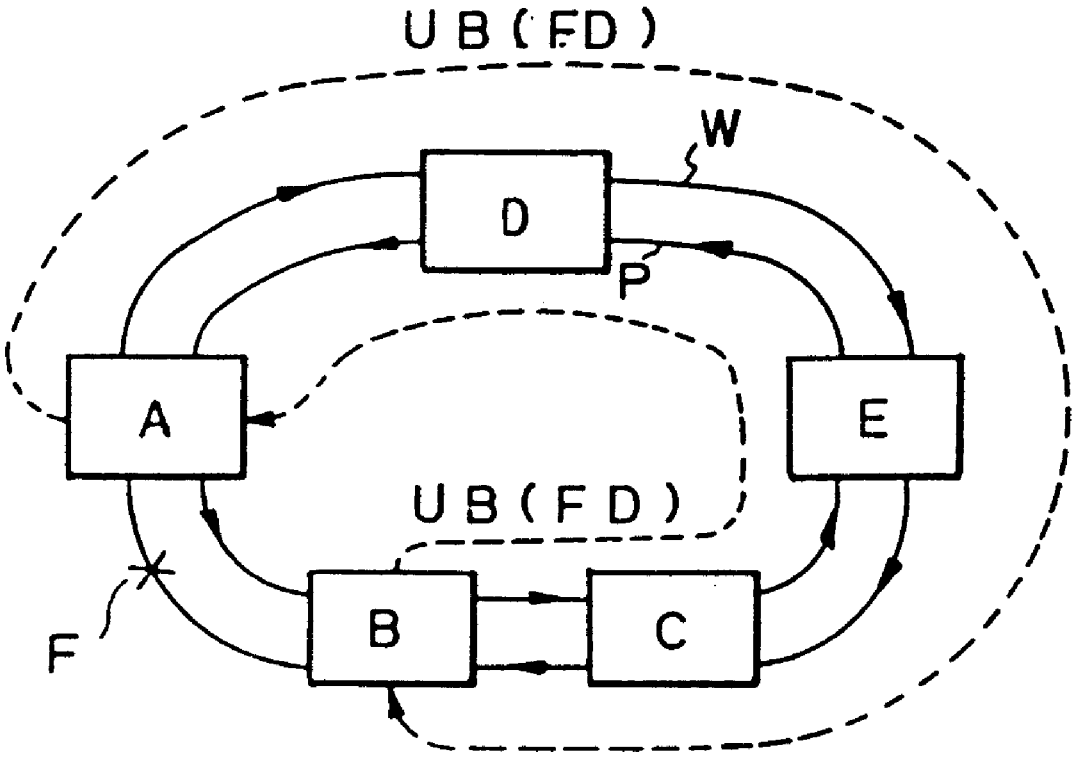
FIG. 5 is a principal construction diagram of the fault recovery system of a hybrid ring according to still another embodiment of the present invention.

In the Case of a Hybrid-type Ring Network (FIG. 5)

In this case also, similar to the distributed control type shown in FIGS. 3A to 3C, there is no supervision node, and therefore the respective drop/insert nodes are in an equal relation to each other. As shown in FIG. 5, when a fault occurs in a point between the nodes A and B, the signal from the node A through the downstream side of the working line W is transmitted through the nodes D, E, and C until it is received by the node B. However, the signal from the node A through the protection line P continues to be transmitted through the loop if there is no countermeasure.

In the hybrid ring, a selecting unit is provided in each node for selecting a signal to be dropped as follows. Namely, in each node, if the input signal from the working line W indicates a fault, the input signal from the protection line P is dropped; if the input signal from the protection line P indicates a fault, the input signal from the working line W is dropped; and if both input signals are normal, the input signal from the working line W is dropped. If, however, the channel should not be dropped, the input signal is passed as it is.

In this case, similar to the case of FIGS. 2A to 2C and FIGS. 3A to 3C, when each node detects an input fault in the working line W or the protection line P, fault data is written in the user bytes and is transmitted downstream of the working line W and the protection line P, and when an input fault is not detected, the user bytes are passed as they are, whereby, in the case of FIG. 5, the fault state between the nodes A and B can be evaluated with reference to the user bytes UB.

In the following paragraphs, embodiments of a fault recovery system of a ring network relating to the present invention are described in more detail.

First, the F1 byte in the STM-1 frame format shown in FIG. 1 is used as a predetermined user byte in the overhead used in the system of the present invention. This byte however, may be the Z1 or Z2 byte assigned for national use, or may be one utilizing various modifications.

FIG. 6A shows an embodiment of the F1 byte. In this embodiment, bits b1 and b2 are assigned as indicators. When the bit b1 is "0", the bit b1 indicates whether there is a fault on the working line; and when b1 is "1", it indicates whether there is a fault on the protection line. When the bit b2 is "0", the bit b2 indicates a fault report; and if the bit b2 is "1", it indicates that the node identification number of the node which should accept the loopback request (protection switching) is being conveyed. Also, the bits b3–b8 are assigned to the identification number of a node for identifying the node relating to the fault.

In an F1 byte as above, since only 6 bits can be used as node number data, when the number of nodes exceeds $2^6$=64, it is impossible to identify all nodes using the 6 bits. In this case, two continuous bytes, a first F1 byte and a second F1 byte having, all [total] *total,* 12 free bits as shown in FIG. 6B, may be utilized. The heading bit b1 of the first F1 byte is defined as "0" so that the first F1 byte conveys fault data relating to the working line W, and the heading bit b1 of the second byte F1 is defined as "1" so that the second F1 byte conveys fault data relating to the protection line P. These bytes are respectively used for detecting faults on the working line P and the protection line W. An example of the first F1 byte and the second F1 byte is shown in FIG. 6C, wherein (1) shows that both the working line and the protection line are in normal states, (2) shows that the node "3" on the protection line has detected an input fault because the bits b7 and b8 in the second F1 byte are "1", and (3) shows that the node "1" on the working line has detected an input fault because the bit b8 in the first F1 byte is "1".

In the following description, for the sake of simplicity, the first F1 byte and the second F1 byte are combined and indicated as F1 (#n,#k,S) as shown in FIG. 6D, where #n indicates a node number which has detected a fault on the working line, #k indicates a node number which has detected a fault in the protection line, and S indicates whether the data indicates a fault report ("0") or a loopback request ("1").

In the following, the fault recovery system in the above-described respective rings will be described using the above-mentioned F1 byte.

Centralized Control Type Ring

Figure 7:
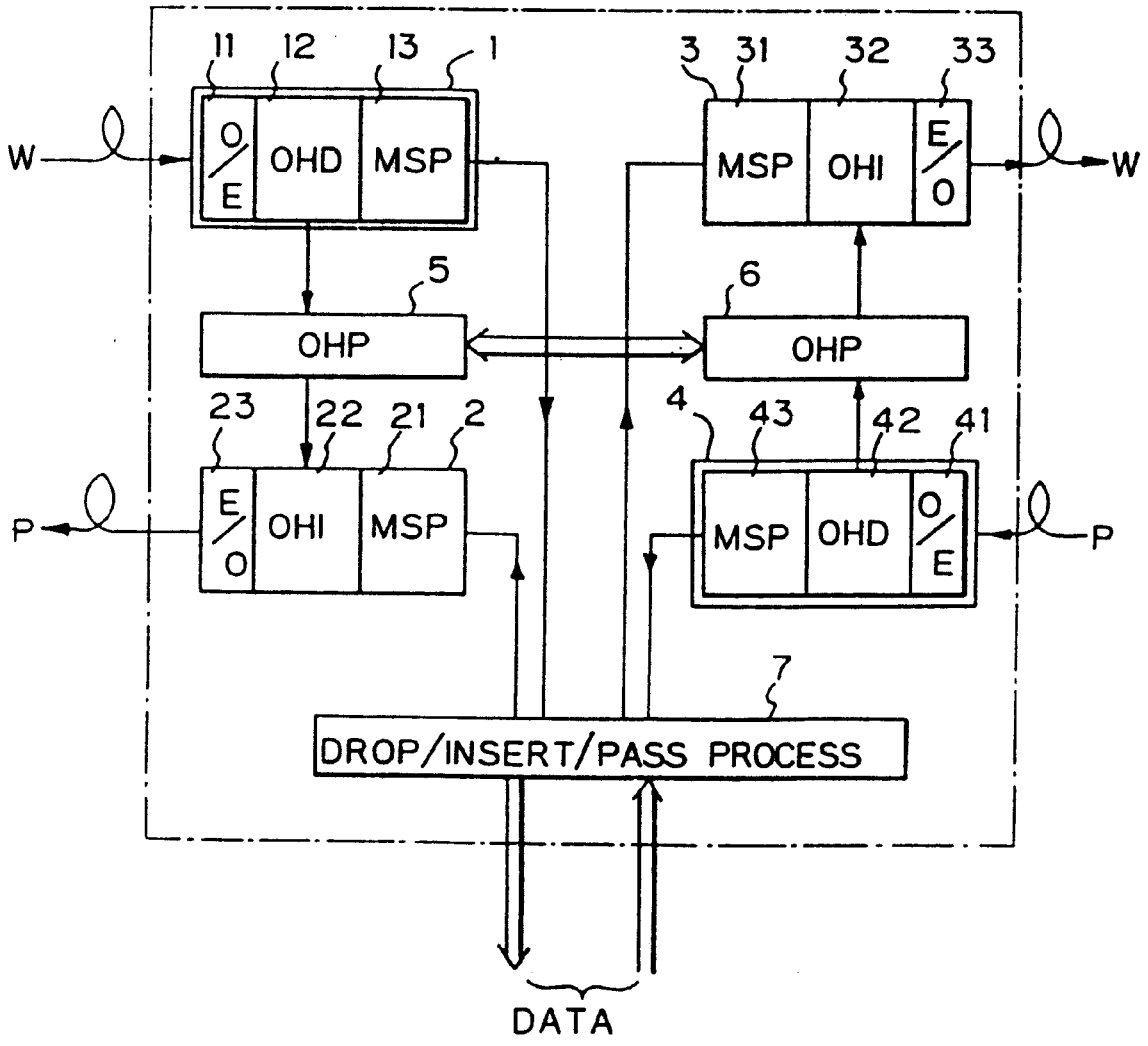
FIG. 7 is a block diagram showing a construction example of a drop/insert node and a supervision node constructing the centralized control type or the distributed control type ring according to the present invention.

FIG. 7 shows an embodiment of a drop/insert node or a supervision node used in the centralized control type ring network, which is constructed by a receiving unit 1 and a transmitting unit 3 for the working line W, a receiving unit 4 and a transmitting unit 2 for the protection line P, overhead processing units 5 and 6, and a data drop/insert/pass processing unit 7. The receiving units 1 and 4 are respectively constructed by light receiving units 11 and 41 connected to the working line W and the protection line P for converting light input signals into electrical signals, overhead dropping units 12 and 42 for dropping the overhead from the electrical signals to provide to the overhead processing units 5 and 6, and main signal processing units 13 and 43 for processing main signals other than the overheads and for sending the dropped and passed signals to the data drop/insert/pass processing unit 7. The transmitting units 2 and 3 are respectively constructed by main signal processing units 21 and 31 for processing the inserted and passed signals from the data drop/insert/pass processing unit 7, overhead inserting units 22 and 32 for inserting overheads from the overhead processing units 5 and 6 into the inserted and passed signals, and light transmitting units 23 and 33 for converting the thus generated electric signals into light signals and for transmitting them to the protection line P and the working line W, respectively. Note, the process relating to the overhead is carried out by the overhead processing units 5 and 6.

① An Example of a Cut Causing a Fault in the Working line W (see FIG. 8)

For the case when a fault is caused by a cut in the working line W of an optical fiber between the node A and node B, the fault recovery system of the present invention will now be described.

Figure 8A:
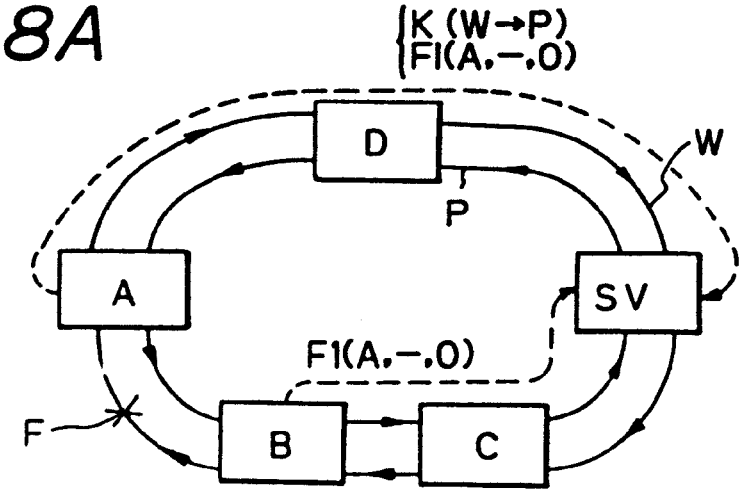
FIGS. 8A to 8C are diagrams showing an example of a break in the working line causing a fault in the centralized control type ring according to still another embodiment of the present invention.

Referring to FIG. 8A, the node A, which has detected, by its light receiving unit 11, the input fault of the working line W such as a missing clock signal, loads the node identification number of the node A on the F1 byte and transmits the F1 byte. In this case, a fault data F1(A,-,0) and a loopback request K(W→P) are transmitted from the node A to the downstream side of the working line W through the communication between the overhead processing units 5 and 6, and fault data F1(A,-,0) is also transmitted from the node A to the downstream side of the protection line P through the communication between the overhead processing units 5 and 6. The loopback request K(W→P) is formed by rewriting the K1 or K2 byte in the STM-1 frame format. Note that, the loopback request K is, as described with reference to FIG. 1, internationally standardized. Therefore, when the K1 or K2 byte is used for the loopback request instead of using the S bit in the F1 byte, it conforms with the international standardization. By contrast, when the S bit (b2 in the F1 byte) is used for the loopback request, the loopback request can also be executed, and therefore, the loopback request K is not always used.

Since the node D is normal, it passes the F1 byte transmitted from the node A through the working line W, and the nodes B and C pass the F1 byte transmitted from the node A through the protection line P. In each of the nodes D, B, and C, the input signal itself is passed through the route in which the receiving unit 1, the data drop/insert/pass processing unit 7, and the transmitting unit 3 are connected.

Figure 8B:
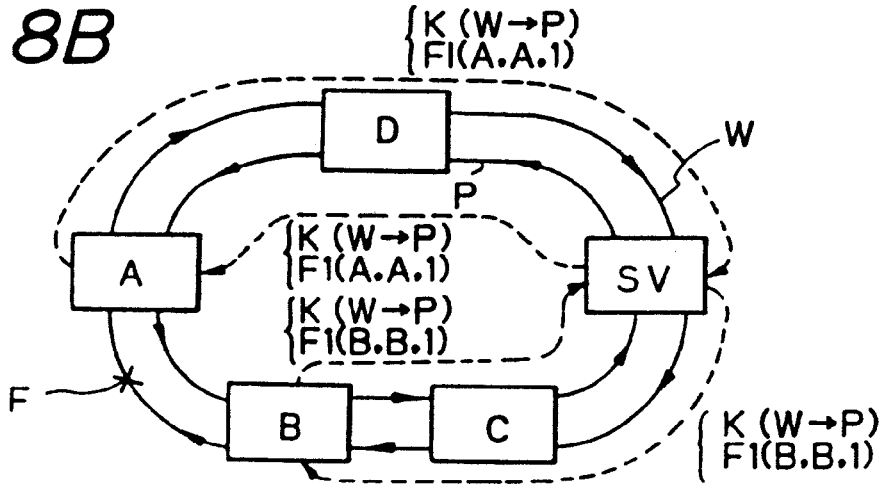

Referring to FIG. 8B, the supervision node SV detects in its overhead processing units 5 and 6 the fault data (F1 byte plus K byte or F1 byte) transmitted from the node A through the working line W and the protection line P, analyzes the new situation including the fault data to determine the node A located immediately downstream of the fault position and closest to the supervision node SV, and transmits, to the protection line P, a loopback request (instruction) K(W→K) and fault data F1 (A,A,1) requiring execution of a loopback at the node A and a fault data F1(A,A,1). The supervision node SV also transmits a loopback request K(W→P) and a fault data F1(B,B,1) requiring a loopback be effected at the node B immediately upstream of the fault position and closest to the supervision node SV. The node A detects the loopback request from the supervision node SV, carries out this loopback, and then returns a loopback response K(W→P) and F1(A,A,1) through the working line W to the supervision node SV. The node B also carries out the loopback, and then returns a response K(W→P) and F1(B,B,1) to the supervision node SV through the protection line P.

Figure 8C:
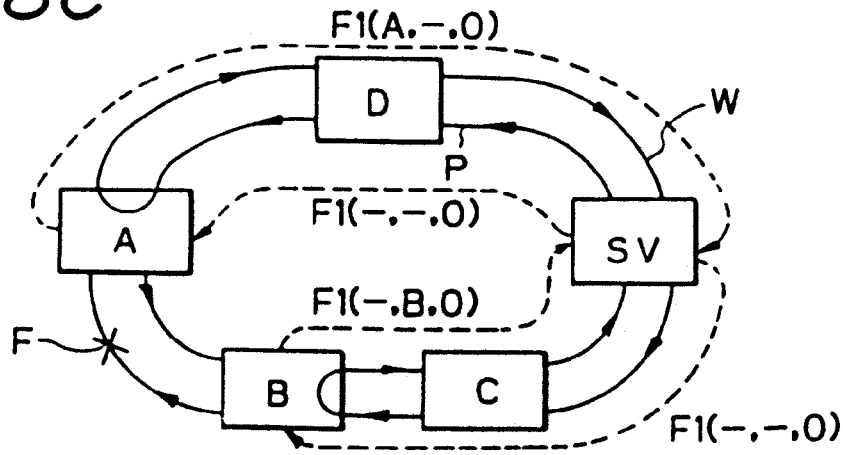

Referring to FIG. 8C, the supervision node SV receives the loopback responses from the nodes A and B, and acknowledges that a fault recovery route (loopback route) has been completed. After completion of the fault recovery, the supervision node SV resets the F1 byte to be all zeroes and transmits F1(-,-,0) to the working line W and the protection line P. Accordingly, in a stationary state where no fault occurs, the supervision node SV detects the F1(A,-,0) from the working line W and F1(-,B,0) from the protection line P.

Figure 9A:
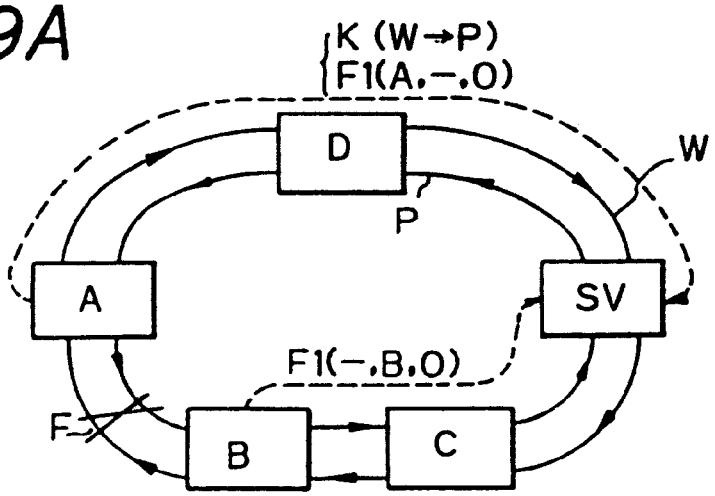
FIGS. 9A to 9C are diagrams showing an example of breaks in both the working line and the protection line causing a fault in the centralized control type according to still another embodiment of the present invention.
Figure 9B:
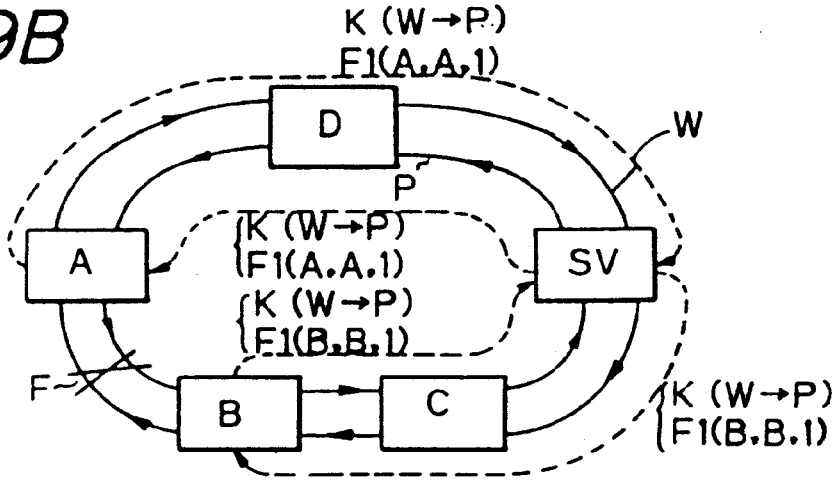
Figure 9C:
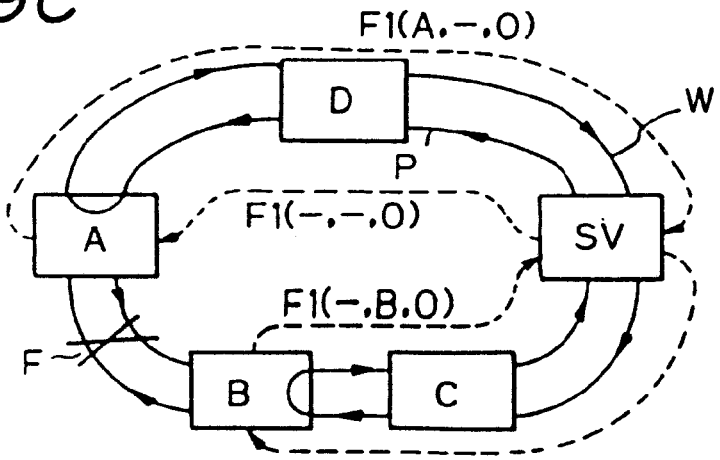

② An Example of Cuts Causing Faults in the Working Line W and the Protection Line P (see FIGS. 9A to 9C)

For the case when faults caused by cuts in both the working line W and the protection line P between the node A and the node B occurs, the fault recovery system of the present invention is described.

Referring to FIG. 9A, the node A, which has detected an input fault on the working line W, transmits F1(A,-,0) and a loopback request K(W→P) to the downstream side of the working line W, and transmits F1(A,-,0) to the downstream side of the protection line P; and the node B, which has detected the input fault on the protection line P, transmits F1(-,B,0) to the downstream side of the protection line P.

In this case, even if the F1(A,-,0) is transmitted from the node A to the downstream side of the protection line P, it does not reach the node B because the optical fiber of the protection line P between the node A and the node B is cut. Similarly, even when F1(-,B,0) is transmitted from the node B to the downstream side of the working line W, F1(-,B,0) on the working line W does not reach the node A because of the fiber cut (cut in W). Since the node D is normal, it passes the F1 byte transmitted from the node A through the working line W, and the node C passes the F1 byte transmitted from the node B through the protection line P.

Referring to FIG. 9B, the supervision node SV detects the loopback request K(W→P) and the fault data F1(A,-,0) transmitted from the node A through the working line W, detects the fault data F1(-,B,0) transmitted from the node B through the protection line P, analyzes this new situation including the fault data to determine the position of the fault, transmits a loopback request K(W→P) requiring to loopback at the node A and F1(A,A,1) to the downstream side of the protection line P, and transmits a loopback request K(W→P) requiring a loopback at the node B and F1(B,B,1) to the downstream side of the working line W.

The node A detects the loopback request from the supervision node SV through the protection line P, carries out this loopback operation, and then returns a response K(W→P) and F1(A,A,1). The node B also carries out the loopback operation and then returns a response K(W→P) and F1(B,B,1) to the supervision node SV.

Referring to FIG. 9C, the supervision node SV acknowledges the completion of a fault recovery route (loopback route) by receiving the loopback responses from the nodes A and B. After the completion of the fault recovery, the supervision node SV resets the F1 bytes to be all zeroes and transmits them to the working line W and the protection line P. Accordingly, in the stationary state in which there is no fault in the ring network, the supervision node SV detects the F1(A,-,0) from the working line W and the F1(-,B,0) from the protection line P.

Figure 10A:
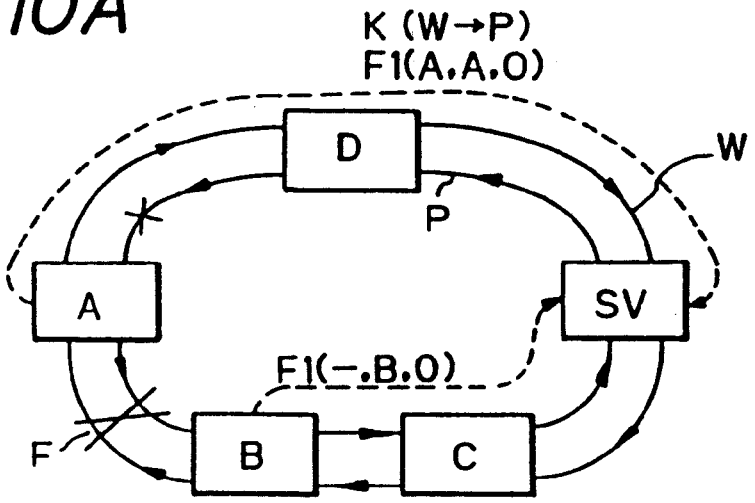
FIGS. 10A to 10C are diagrams showing an example of when plural faults occur in the centralized control type ring according to still another embodiment of the present invention.
Figure 10B:
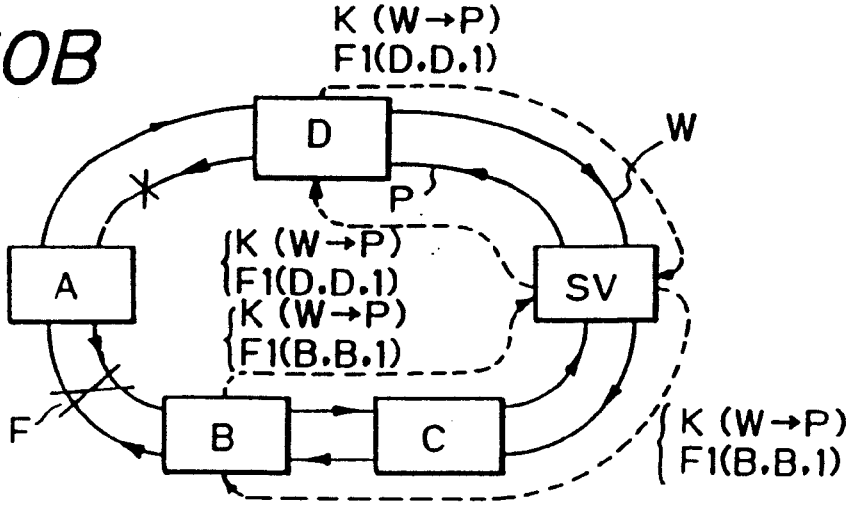
Figure 10C:
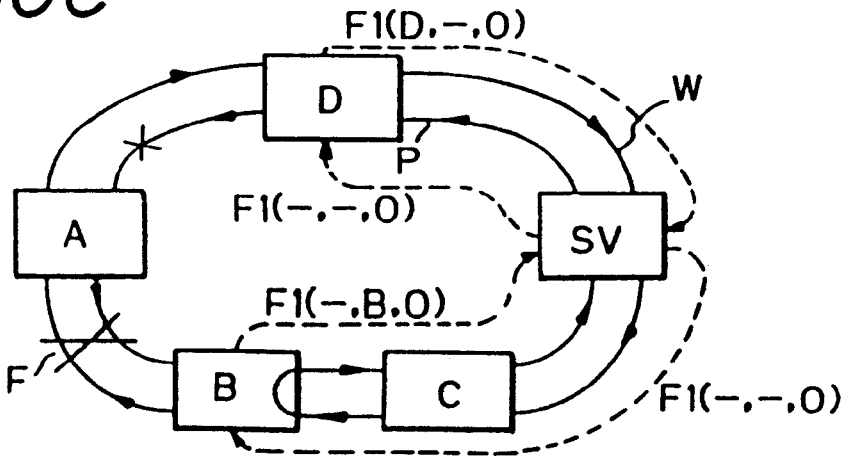

③ An Example of Plural Faults (see FIGS. 10A to 10C)

For the case when both the working line W and the protection line P between the nodes A and B are cut and when the protection line P is cut between the nodes D and A, the fault recovery system of the present invention will be described.

Referring to FIG. 10A, similar to the above example shown in FIG. 9A, the node A transmits a loopback request K(W→P) and F1(A,A,0) through the downstream side of the working line W to the supervision node SV, and node B transmits fault data F1(-,B,0) through the downstream side of the protection line P to the supervision node SV.

Referring to FIG. 10B, the supervision node SV analyzes the new situation including the fault state to determine the position of the fault. Then the supervision node SV transmits a loopback request K(W→P) requiring a loopback at the node D and F1(D,D,1) to the downstream side of the protection line P, and transmits a loopback request K(W→P) requiring to loopback at the node B and F1(B,B,1) to the downstream side of the working line W. Then, the node D detects the loopback request from the supervision node SV, carries out this loopback operation, and returns a response K(W→P) and F1(D,D,1) to the supervision node SV. The node B also detects the loopback request from the supervision node SV, carries out this loopback operation, and returns a response K(W→P) and F1(B,B,1) to the supervision node SV.

Referring to FIG. 10C, the supervision node SV acknowledges the completion of a fault recovery route (loopback route) by receiving the loopback responses from the nodes D and B. After the completion of the fault recovery, the supervision node SV resets the F1 bytes to be all zeroes and transmits them to the working line W and the protection line P. Accordingly, in a stationary state in which there is no fault, the supervision node SV detects F1(D,-,0) from the working line W and F1(-,B,0) from the protection line P.

Distributed Control Type Ring

In this distributed control type ring network, there is no supervision node, and the respective drop/insert nodes are placed in an equal relation to each other. In this case also, the example of the construction shown in FIG. 7 can be applied, and the difference from the centralized control type ring is that, since there is no supervision node, the F1 bytes are not reset by the supervision node, and the others are processed in a similar way to those in the centralized control type ring.

Figure 11A:
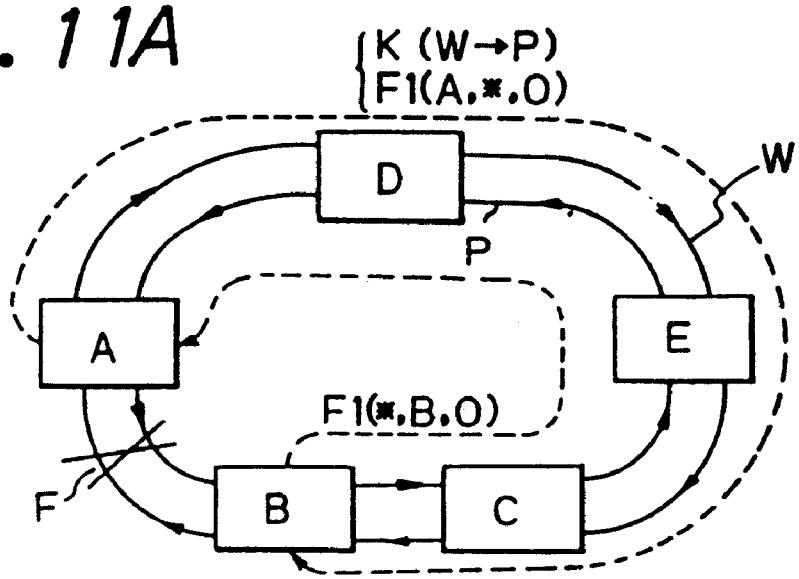
FIGS. 11A to 11C are diagrams showing an example when both the working line and the protection line are cut causing a fault in the distributed control type ring according to still another embodiment of the present invention.
Figure 11B:
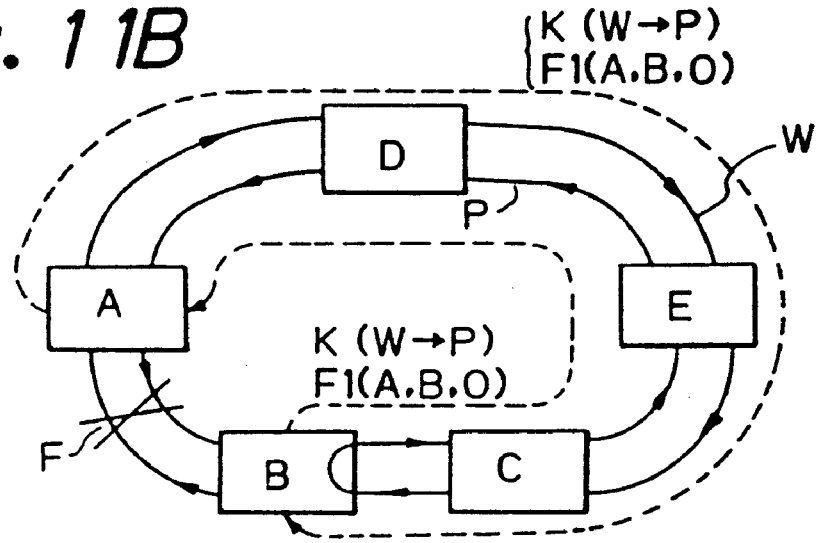
Figure 11C:
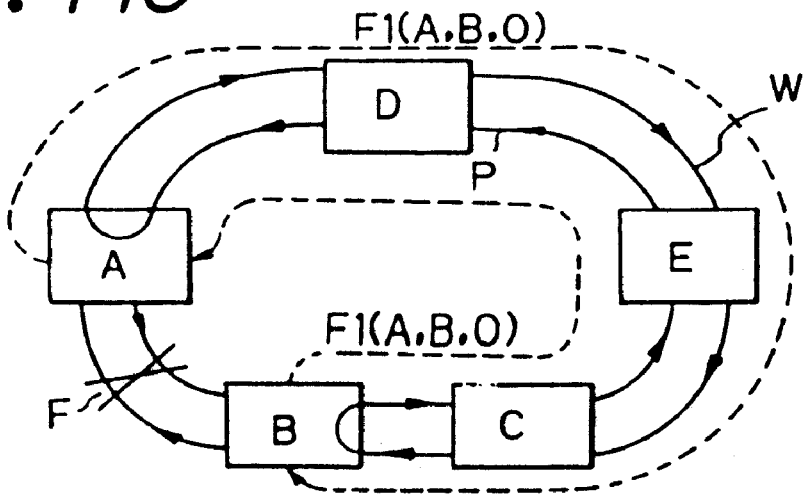

① An Example of Cuts Causing Faults in the Working Line W and the Protection Line P (see FIGS. 11A to 11C)

For the case when both the working line W and the protection line P between the nodes A and B are cut, the fault recovery system of the present invention will be described.

Referring to FIG. 11A, the node A which has detected a fault on the working line W transmits F1(A,*,0) and a loopback request K(W→P) to the downstream side of the working line W, and transmits F1(A,*,0) to the downstream side of the protection line P. In this case, in the initial state of the fault, there is a possibility that the node A may not have been informed on the fault on the protection line P because the fault on the protection line P is at the output side of the node A, so that the node A may transmit F1(A,*,0) to the downstreams of the working line W and the protection line P. The node A, however, will have been informed of the fault on the protection line P from the later received fault data from the node B through the protection line P. After the node A acknowledges the fault on the protection line P, the node A transmits F1(A,B,-) to the downstream sides of the working line W and the protection line P. In this case, * represents a time dependent parameter. Note, in this case also, if the K bytes of the loopback request are not used as mentioned before, a loopback request to an other node is realized by changing the "0" in the F1(A,*,0) to "1".

The node B which has detected a fault on the protection line P transmits F1(*,B,0) of the F1 bytes containing the node identification number of the node B, to the downstream sides of both the working line W and the protection line P. In this case, the F1(A,*,0) on the protection line P does not reach the node B because of the cut fiber (P cut), and the F1(*,B,0) on the working line W does not reach the node A because of the cut fiber (W cut). The nodes D, E, and C pass the F1 byte transmitted from the node A through the working line W, and the nodes C, E, and D pass the F1 byte transmitted from the node B through the protection line P.

Referring to FIG. 11B, the node B detects the loopback request K(W→P) and the fault data including the F1(A,*,0) transmitted from the node A through the working line W. By analyzing the fault data F1(A,*,0), the node B recognizes that its own node B is placed immediately upstream of the fault position, i.e., just before the node A which has transmitted the fault data. This recognition is possible because all of the nodes are provided with their own node identification numbers in advance. Accordingly, the fault on the protection line P between the nodes A and B is determined so that a loopback operation is executed at the node B. The node B then transmits a loopback response K(W→P) and F1(A,B,0) through the protection line P to the node A.

Referring to FIG. 11C, the node A receives the loopback response K(W→P) and the F1(A,B,0) from the node B through the protection line P so that it determines the position of the fault on the working line W between the nodes A and B. Then the node A executes a loopback operation from the protection line P to the working line W. In this way, it is recognized that the fault recovery route (loopback route) has been completed, and, in a stationary state after the fault recovery completion, the F1(A,B,0) is transmitted through the working line W and the protection line P.

Figure 12A:
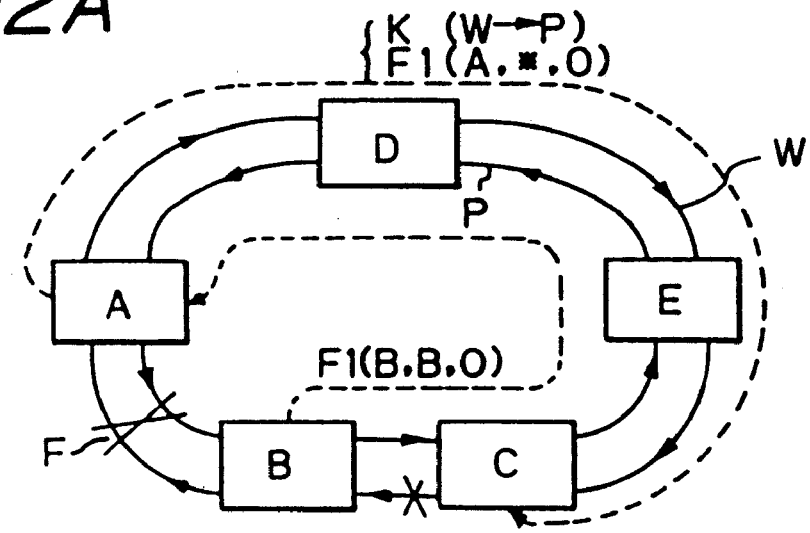
FIGS. 12A to 12C are diagrams showing an example of when plural faults occur in the distributed control type ring according to still another embodiment of the present invention.
Figure 12B:
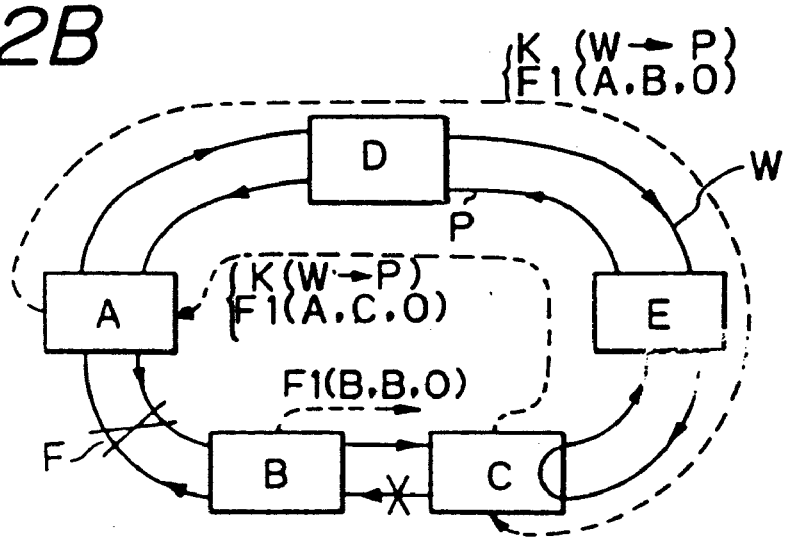
Figure 12C:
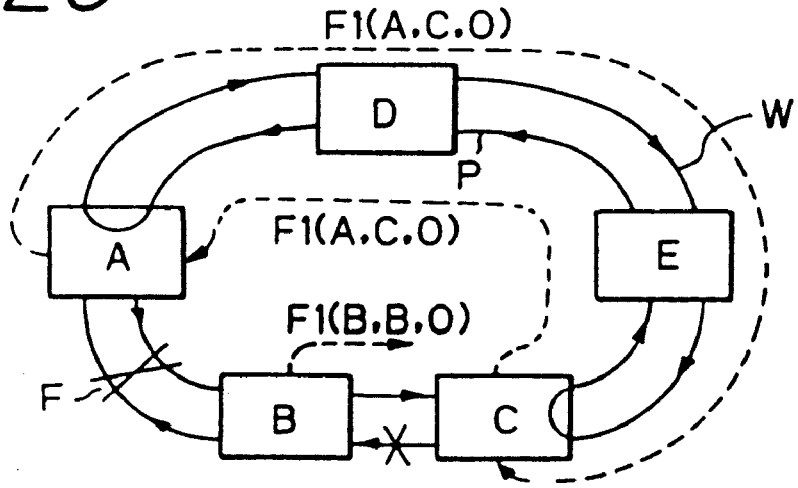

③ An Example of Plural Faults (see FIGS. 12A to 12C)

For the case when faults occur due to cut in both the working line W and the protection line P between the node A and the node B, and a cut in the working line W between the nodes B and C, the fault recovery system of the present invention will be described.

Referring to FIG. 12A, the node A transmits a loopback request K(W→P) and F1(A,*,0) through the downstream side of the working line W to the node C, and the node B transmits F1(B,B,0) through the downstream side of the protection line P to the node A since both the working line W and the protection line P are in their input fault states.

Referring to FIG. 12B, the node C detects the fault on the working line W between the node C and the node B based on the fault data F1(B,B,0) transmitted from the node B through the protection line P and the fault data F1(A,*,0) from the node A. The node C analyzes this new situation, executes a loopback operation, and transmits a loopback response K(W→P) and F1(A,C,0) to the node A through the protection line P.

Referring to FIG. 12C, the node A, which receives this loopback response K(W→P) and F1(A,C,0) from the node C, determines the fault on the working line W between the nodes A and B. Then, the node A executes the loopback operation at the node A to complete the fault recovery route (loopback route). In the stationary state after completion of the fault recovery completion, F1(A,C,0) is transmitted through the working line W and the protection line P.

Hybrid Ring

In this case also, there is no supervision node so that the respective nodes have an equal relation to each other.

Figure 13:
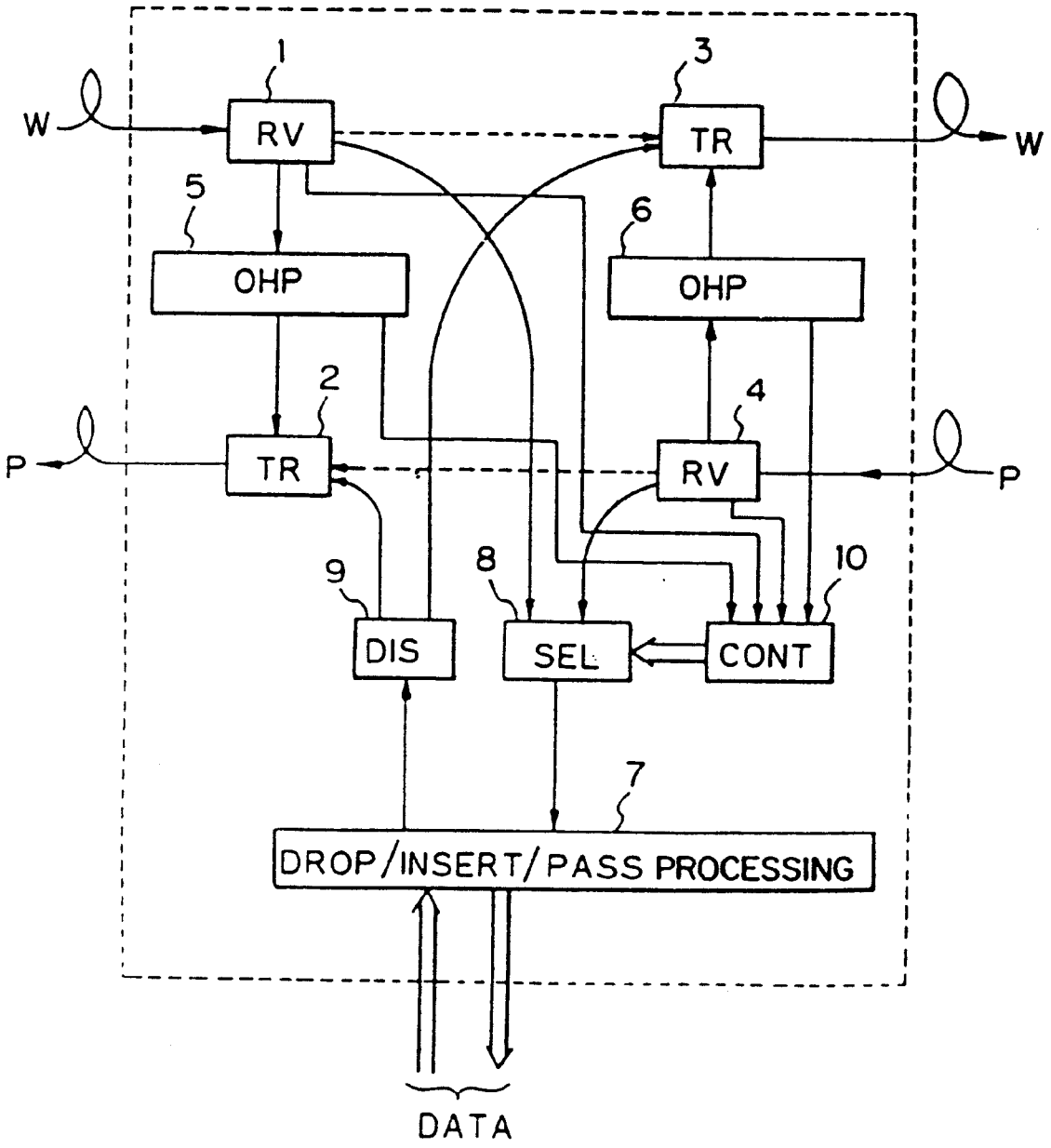
FIG. 13 is a block diagram showing a construction example of each drop/insert node in the hybrid ring used in the system of the present invention.

FIG. 13 schematically shows the construction of each node. In the figure, the same reference as those in FIG. 7 represent the same parts, and, also included are a selector 8 for selecting data to be dropped or passed from or the receiving unit 1 or 4 to the data drop/insert/pass processing unit 7, a distributing unit 9 for distributing the inserted or passed data from the data drop/insert/pass processing unit 7 to the transmitting units 2 or 3, and a control circuit 10 for controlling the selector 8. The control circuit 10 selects a normal signal from the signals received by the receiving units 1 and 4. When both are normal, the control circuit 10 selects the receiving signal on the working line W. However, the selector 8 is controlled only when the drop/insert mode is effected for the corresponding channel which needs to be dropped or inserted. In the case of another channel, namely, when the channel is not to be dropped or inserted, the receiving units 1 and 4 and the transmitting units 3 and 2 are connected straight through as illustrated in the figure by a dotted line. Note, the discrimination of whether or not the signal is normal can be carried out based on a cut in the input signal or by a lack of frame synchronization. It may also be discriminated by an alarm indication or a pointer indicating an abnormal in H1 and H2 pointer bytes included in the overhead of the STM frame which is processed by the overhead processing units 5 and 6.

Examples of faults in the hybrid ring using the node having such a construction as described above, are illustrated in FIG. 14.

(1) An Example When the Working Line W Between the Nodes A and B is Cut

In this case, as the F1 byte of the fault data, the F1 byte F1(A,-,0) which is the same as the one shown in FIGS. 8A to 8C is output from the nodes A and B (time t1). In the node A, since an input fault occurs on the working line W, only the received signal transmitted from the node D through the protection line P is determined as normal and is received byte by byte. Also, in the node B, the received signal from the node C through the working line W and the received signal from the node A through the protection line P are received as normal and are received byte by byte. Therefore, the control circuit 10 in the node B switches the selector 8 to receive with priority the received signal from the working line W. Note, the other nodes C, D, and E only pass the received signals on the working line W and the protection line P.

After this, even at a time t2, after some time has passed from the time t1, the state of the F1 byte is unchanged.

Thus, through the working line W and the protection line P, the node A and the node B communicate with each other without loopback.

Also, since the overhead is used in this case also, the fault evaluation (of a cut in the working line W between the nodes A and B) can be executed in a way similar to that mentioned above in the nodes A and B.

(2) An Example When Both the Working Line W and the Protection Line P Between the Nodes A and B are cut In this case, the F1 bytes F1(A,-,0) and F1(-,B,0) as the fault data, which are the same F1 bytes as shown in FIGS. 9A to 9C and FIGS. 11A to 11C, are output from the nodes A and B, respectively (time t1). The node A receives only the receiving signal transmitted from the node D through the protection line P as a normal signal because the input fault occurs on the working line W between the nodes A and B, the node B receives only the receiving signal transmitted from the node C through the working line W as a normal signal because the input fault occurs on the protection line P between the nodes A and B.

After this, at a time t2, since both the node A and the node B have been informed, respectively, of the faults on the protection line P and the working line W, the F1 bytes become F1(A,B,0) as illustrated in FIG. 14(2).

Thus, through the working line W and the protection line P, the node A and the node B communicate with each other without loopback.

Also, through the use of the used byte in this case also, the fault evaluation (of a cut in the working line W between the nodes A and B) can be executed in the nodes A and B in a way similar to that mentioned before.

(3) An Example When Both the Working Line W and the Protection Line P Between the Nodes A and B are Cut and the Working line W between the Nodes B and C is Cut In this case, the F1 bytes F1(A,-,0) and F1(B,B,0) as the fault data, which are the same F1 bytes as shown in FIGS. 10A to 10C and FIGS. 12A to 12C, flow through the working line W and the protection line P (time t1). The node A receives only the receiving signal transmitted from the node D through the protection line P as a normal signal because the input fault occurs on the working line W between the nodes A and B, the node B cannot receive a signal because the input faults occur on both the working line W and the protection line P, and the node C receives with priority the receiving signal transmitted from the node E through the working line W as a normal signal.

At a time t2 after a certain amount of time has passed, the node A detects the input fault of the node B so that the F1 byte F1(A,B,0) as illustrated in the figure flows through the working line W.

Thus, through the working line W and the protection line P, the nodes A and C communicate with each other without loopback.

In this case also, since the overhead is used, the fault evaluation (of a cut in the working and protection lines between the nodes A and B, and a cut in the working line W between the nodes B and C) can be executed in the nodes A, B, and C in a way similar to that mentioned before.

Thus, in the hybrid ring also, by applying the overhead, the ability to respond to a fault in a ring (especially the case of a plurality of faults or a catastrophic fault) can be increased.

As described above, according to the fault recovery system of a ring network relating to the present invention, by utilizing a predetermined user byte in the overhead of the STM frame used in the synchronous transport module transmitting system, an input fault detected in any node in a centralized control type ring, distributed control type ring, or hybrid ring is transferred to another node, whereby the supervision node or the drop/insert node detects the position of the fault to execute a loopback operation or a hybrid process. Therefore, since no protocol is used in the fault recovery process, the fault can be recovered in a short time.

We claim:

1. A centralized control type ring network based on a synchronous transport module transmission system, having a fault recovery system for recovering a fault in said centralized control type ring network, said centralized control type ring network comprising:

optical fiber transmission lines including a working line and a protection line running in opposite directions to each other;

a plurality of drop/insert nodes connected to each other through said optical fiber transmission lines;

a supervision node, connected through said optical fiber transmission lines to said drop/insert nodes;

each of said drop/insert nodes having input fault detecting means for detecting an input fault on the working line or the protection line, fault data writing means for writing, when said input fault is detected by said input fault detecting means, fault data in a predetermined user byte in an overhead of a frame flowing through both of the working line and the protection line, and user byte passing means for passing said user byte as is through said node, when an input fault is not detected by said input fault detecting means;

said supervision node having fault data detecting means for detecting the fault data in said user byte transmitted from the node which has detected said input fault through the downstream sides of the working line and the protection line of said node which has detected said input fault;

fault position determining means for determining, based on said fault data detected by said fault data detecting means, a node which has detected said input fault;

writing means for writing, into said user bytes, loopback requests for requesting nodes located immediately downstream and upstream of the fault position and closest to said supervision node, to execute loopback operations; and sending means for sending said loopback requests through said working line and said protection line to said nodes located downstream and upstream of the fault position, whereby said nodes located immediately downstream and upstream of the fault position and closest to said supervision node execute loopback operations to recover the fault.

2. A ring network as claimed in claim 1, wherein said synchronous transport module transmission system is a system according to a recommendation of CCITT G.707, 708, and 709.

3. A ring network as claimed in claim 1, wherein said fault data includes a node identification number for identifying the node which has detected the input fault.

4. A ring network as claimed in claim 1, wherein said fault data includes fault line information indicating whether said input fault has occurred on said working line or on said protection line.

5. A ring network as claimed in claim 4, wherein said fault data includes fault reporting information.

6. A ring network as claimed in claim 4, wherein said loopback requests are formed by rewriting said fault data to include a node identification number of a node at which the loopback should be executed, and loopback request information.

7. A ring network as claimed in claim 1, wherein said loopback requests are formed by using another byte other than said predetermined user byte in said overhead of said frame.

8. A ring network as claimed in claim 7, wherein said other type in said overhead of said frame is the K1 byte or the K2 byte according to a recommendation of CCITT G.707, 708, and 709.

9. A ring network as claimed in claim 1, wherein said writing means includes rewriting means for rewriting said fault data transmitted through said working line into a first loopback request and for rewriting said fault data transmitted through said protection line into a second loopback request, and said sending means through said protection line and for sending said second loopback request to said working line.

10. A ring network as claimed in claim 1, wherein said ring network is a bidirectional ring network comprising a pair of clockwise and counterclockwise working lines and a pair of counterclockwise and clockwise protection lines.

11. A ring network as claimed in claim 10, comprising a plurality of pairs of said working lines and a single pair of said protection lines.

12. A distributed control type ring network based on a synchronous transport module transmission system, having a fault recovery system, said distributed control type ring network comprising:

optical fiber transmission lines including a working line and a protection line running in opposite directions to each other;

a plurality of drop/insert nodes connected to each other through said optical fiber transmission lines, each of said drop/insert nodes having input fault detecting means for detecting an input fault on the working line or the protection line, fault data and loopback request writing means for writing, when said input fault is detected by said input fault detecting means, fault data and a loopback request in a predetermined user byte in an overhead of a frame flowing through both the working line and the protection line, loopback executing means for executing, based on said fault data detected by said fault data detecting means, a loopback when said node is located immediately upstream of said input fault and adjacent to a node which has not detected an input fault; and said node executing said loopback returning, in response to said loopback request, a loopback response by the use of said predetermined user byte to said node which has detected said input fault.

13. A ring network as claimed in claim 12, characterized in that said synchronous transport module transmission system is the system according to a recommendation of CCITT G.707, 708, and 709.

14. A ring network as claimed in claim 12, wherein said fault data includes a node identification number for identifying the node which has detected the input fault.

15. A ring network as claimed in claim 14, wherein said fault data includes fault line information indicating whether said input fault has occurred on said working line or on said protection line.

16. A ring network as claimed in claim 15, wherein said fault data includes fault reporting information.

17. A ring network as claimed in claim 16, wherein said loopback request is formed by rewriting said fault reporting information in said fault data.

18. A ring network as claimed in claim 12, wherein said loopback request is formed by using another byte other than said predetermined user byte in said overhead of said frame.

19. A ring network as claimed in claim 18, wherein said other byte in said overhead of said frame is the K1 byte or the K2 byte according to a recommendation of CCITT G. 707, 708 and 709.

20. A ring network as claimed in claim 12, wherein said ring network is a bidirectional ring network comprising a pair of clockwise and counterclockwise working lines and a pair of counterclockwise and clockwise protection lines.

21. A ring network as claimed in claim 20, comprising a plurality of pairs of said working lines and a single pair of said protection lines.

22. A hybrid type ring network based on a synchronous transport module transmission system, having a fault recovery system, said hybrid type ring network comprising:

optical fiber transmission lines including a working line and a protection line running in opposite directions to each other; and a plurality of drop/insert nodes connected to each other through said optical fiber transmission lines, each of said drop/insert nodes including input fault detecting means for detecting an input fault on the working line or the protection line, selecting means for dropping the input signal from said protection line when the input signal from said working line is faulty, for dropping the input signal from said working line when the input signal from said protection line is faulty, and for dropping the input signal from said working line when both are normal, and passing the signal as is when the signal is not to be dropped;

fault data writing means for writing, when said input fault is detected by said input fault detecting means, fault data in a predetermined user byte in an overhead of a frame flowing through both of the working line and the protection line; and user type passing means for passing, when an input fault is not detected by said input fault detecting means, said user byte as is through said node.

23. A fault recovery system of a hybrid type ring network as claimed in claim 22, characterized in that said synchronous transport module transmission system is a system according to [the] a recommendation of CCITT G. 707, 708, and 709.

24. A fault recovery system of a hybrid ring network as claimed in claim 22, wherein said fault data includes a node identification number for identifying the node which has detected the input fault.

25. A fault recovery system of a hybrid ring network as claimed in claim 22, wherein said fault data includes fault line information indicating whether said input fault has occurred on said working line or on said protection line.

*26. A node for communication through a ring network having a plurality of nodes interconnected by first and second transmission lines, the first transmission line transporting a transmission signal frame including an overhead byte around the ring network in a first direction and the second transmission line transporting a transmission signal frame including an overhead byte around the ring network in a second direction opposite to the first direction, the node comprising:*

*detecting means for detecting a fault on an upstream side of the first transmission line; and*

*transmitting means for transmitting to a downstream side of the first transmission line, in response to the fault detected by said detecting means, a request signal for directing a received transmission signal frame from the upstream side of the first transmission line to a downstream side of the second transmission line by inserting the request signal onto the overhead byte of the transmission signal frame.*

*27. The node according to claim 26, wherein said transmitting means transmits the request signal to the downstream sides of both of the first and second transmission lines.*

*28. The node according to claim 26, wherein the first transmission line is a working line for the transmission*

*signal frame and the second transmission line is a protection line for the transmission signal frame.*

*29. The node according to claim 26, wherein said transmitting means transmits, via the second transmission line, the request signal addressed to an adjacent node connected thereto on the upstream side of the first transmission line on which the fault is detected.*

*30. A node for communication through a ring network having a plurality of nodes interconnected by first and second transmission lines, the first transmission line transporting a transmission signal frame including an overhead byte around the ring network in a first direction and the second transmission line transporting a transmission signal frame including an overhead byte around the ring network in a second direction opposite to the first direction, said node comprising:*

*a fault detector, to detect a fault on an upstream side of the first transmission line; and*

*an overhead processor to insert, in response to the fault detected by said fault detector, a request signal for directing a received transmission signal frame from the upstream side of the first transmission line to a downstream side of the second transmission line onto the overhead byte of the transmission signal frame, and to transmit the transmission signal frame to a downstream side of the first transmission line.*

*31. The node according to claim 30, wherein the overhead processor transmits the transmission signal frame to the downstream side of both the first transmission line and the second transmission line.*

*32. The node according to claim 30, wherein the first transmission line is a working line for the transmission signal frame and the second transmission line is a protection line for the transmission signal frame.*

*33. The node according to claim 30, wherein the overhead processor inserts, onto the overhead byte, the request signal addressed to an adjacent node connected thereto via the first transmission line on the upstream side of which the fault is detected, and the second transmission line.*

*34. A node for communication through a ring network having a plurality of nodes interconnected by first and second transmission lines, the first transmission line transporting a transmission signal frame including an overhead byte around the ring network in a first direction and the second transmission line transporting a transmission signal frame including an overhead byte around the ring network in a second direction opposite to the first direction, said node comprising:*

*receiving means for receiving the transmission signal frame from an upstream side of the first transmission line;*

*detecting means for detecting a request signal to direct a received transmission signal frame from the upstream side of the first transmission line to the downstream side of the second transmission line, the request signal inserted onto the overhead byte of the received transmission signal frame and originated at a different node detecting a fault on the first transmission line upstream of the different node; and*

*directing means for directing, in response to the request signal detected by said detecting means, a received transmission signal frame from the upstream side of the first transmission lines to the downstream side of the second transmission line.*

*35. The node according to claim 34, wherein the first transmission line is a working line for the transmission signal frame and the second transmission line is a protection line for the transmission signal frame.*

*36. A node for communication through a ring network having a plurality of nodes interconnected by first and second transmission lines, the first transmission line transporting a transmission signal frame including an overhead byte around the ring network in a first direction and the second transmission line transporting a transmission signal frame including an overhead byte around the ring network in a second direction opposite to the first direction, said node comprising:*

*a signal receiver to receive a transmission signal frame from an upstream side of the first transmission line;*

*an overhead processor, operatively connected to the signal receiver, to detect a request signal for directing a received transmission signal frame from the upstream side of the first transmission line to a downstream side of the second transmission line, the request signal inserted onto the overhead byte of the received transmission signal frame and originated at a different node detecting a fault on the first transmission line upstream of the different node; and*

*a route selector to direct a received signal frame from the upstream side of the first transmission line to the downstream side of the second transmission line in response to the request signal detected by said overhead processor.*

*37. The node according to claim 36, wherein the first transmission line is a working line for the transmission signal frame and the second transmission line is a protection line for the transmission signal frame.*

*38. A ring network, comprising:*

*a first transmission line for transporting a transmission signal frame including an overhead byte around said ring network in a first direction;*

*a second transmission line for transporting a transmission signal frame including an overhead byte around said ring network in a second direction opposite to the first direction; and*

*a plurality of nodes connected by said first and second transmission lines, each node including:*

*a fault detector to detect a fault on an upstream side of said first transmission line; and*

*an overhead processor to insert, in response to the fault detected by said fault detector, a request signal for directing a transmission signal frame received from the upstream side of said first transmission line to a downstream side of said second transmission line onto the overhead byte of the transmission signal frame, and to transmit the transmission signal frame to the downstream side of said first transmission line.*

*39. A ring network, comprising:*

*a first transmission line for transporting a transmission signal frame including an overhead byte around said ring network in a first direction;*

*a second transmission line for transporting a transmission signal frame including an overhead byte around said ring network in a second direction opposite to the first direction; and*

*a plurality of nodes connected by said first and second transmission lines, each node including:*

*a signal receiver to receive a transmission signal frame from an upstream side of said first transmission line;*

*an overhead processor, operatively connected to said signal receiver, to detect a request signal for directing a transmission signal frame from the upstream*

*side of said first transmission line to a downstream side of said second transmission line, the request signal inserted onto the overhead byte of the transmission signal frame and originated at a different node detecting a fault on the first transmission line upstream of the different node; and*

*a route selector to direct another signal frame from the upstream side of said first transmission line to the downstream side of said second transmission line in response to the detected request signal.*

*40. A method of recovering from a fault in a ring network having a plurality of nodes interconnected by first and second transmission lines, the first transmission line transporting a first transmission signal frame including an overhead byte around the ring network in a first direction and the second transmission line transporting a second transmission signal frame including an overhead byte around the ring network in a second direction opposite to the first direction, comprising:*

*detecting a fault on an upstream side of the first transmission line;*

*inserting a request signal for directing a transmission signal frame received from the upstream side of the first transmission line to a downstream side of the second transmission line onto the overhead byte of the transmission signal frame in response to detection of the fault; and*

*transmitting the transmission signal frame to the downstream side of the first transmission line.*

*41. The method according to claim 40, wherein said inserting includes the step of addressing the request signal to a node located immediately upstream along the first transmission line on which the fault is detected.*

*42. The method according to claim 40, wherein said transmitting includes transmitting the transmission signal frame to the downstream sides of both the first and the second transmission lines.*

*43. A method of recovering from a fault in a ring network having a plurality of nodes interconnected by first and second transmission lines, the first transmission line transporting a first transmission signal frame including an overhead byte around the ring network in a first direction and the second transmission line transporting a second transmission signal frame including an overhead byte around the ring network in a second direction opposite to the first direction, comprising:*

*detecting a fault on an upstream side of the first transmission line;*

*inserting a request signal for directing a transmission signal frame received from the upstream side of the first transmission line to a downstream side of the second transmission line onto the overhead byte of the transmission signal frame in response to detection of the fault;*

*transmitting the transmission signal frame to a downstream side of the first transmission line;*

*receiving the transmission signal frame from the upstream side of the first transmission line;*

*detecting the request signal from the overhead byte of the transmission signal frame; and*

*directing the transmission signal frame from the upstream side of the first the transmission line to the downstream side of the second transmission line in response to detection of the request signal.*

*44. The method according to claim 43, wherein said inserting includes addressing the request signal to a node located immediately upstream along the first transmission line on which the fault is detected.*

*45. The method according to claim 43, wherein said transmitting includes transmitting the transmission signal frame to the downstream side of both the first and the second transmission lines.*

*46. A method of recovering from a fault in a ring network having a plurality of nodes interconnected by first and second transmission lines, the first transmission line transporting a first transmission signal frame including an overhead byte around the ring network in a first direction and the second transmission line transporting a second transmission signal frame including an overhead byte around the ring network in a second direction opposite to the first direction, comprising:*

*receiving the transmission signal frame from an upstream side of the first transmission line;*

*detecting a request signal to direct a received transmission signal frame from the upstream side of the first transmission line to a downstream side of the second transmission line, the request signal inserted onto the overhead byte of the received transmission signal frame and originated at a different node detecting a fault on the first transmission line upstream of the different node; and*

*directing, in response to the request signal, the received transmission signal frame from the upstream side of the first transmission line to the downstream side of the second transmission line.*

* * * * *